(12) United States Patent
Lee et al.

(10) Patent No.: US 11,172,506 B2
(45) Date of Patent: Nov. 9, 2021

(54) METHOD AND APPARATUS FOR PERFORMING CONGESTION CONTROL IN NR V2X

(71) Applicant: LG Electronics Inc., Seoul (KR)

(72) Inventors: Seungmin Lee, Seoul (KR); Hanbyul Seo, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/795,360

(22) Filed: Feb. 19, 2020

(65) Prior Publication Data

US 2020/0187252 A1  Jun. 11, 2020

Related U.S. Application Data

(63) Continuation of application No. PCT/KR2019/010078, filed on Aug. 9, 2019.
(Continued)

(51) Int. Cl.
*H04W 74/08* (2009.01)
*H04B 17/318* (2015.01)
(Continued)

(52) U.S. Cl.
CPC ...... *H04W 74/0808* (2013.01); *H04B 17/318* (2015.01); *H04L 1/1819* (2013.01);
(Continued)

(58) Field of Classification Search
None
See application file for complete search history.

(56) References Cited

U.S. PATENT DOCUMENTS

2018/0234889 A1* 8/2018 Baghel .................. H04W 24/08
2018/0234980 A1* 8/2018 Li ....................... H04W 72/0473
(Continued)

FOREIGN PATENT DOCUMENTS

WO  WO2017160070  9/2017
WO  WO2017171529  10/2017
(Continued)

OTHER PUBLICATIONS

Intel Corporation, "Remaining Physical Layer Aspects of Sidelink Carrier Aggregation for Mode-4 LTE V2V Communication", R1-1806481, 3GPP TSG RAN WG1 Meeting #93, Busan, Korea, May 21-25, 2018, 5 pages.
(Continued)

*Primary Examiner* — Ajit Patel
*Assistant Examiner* — Pamit Kaur
(74) *Attorney, Agent, or Firm* — Fish & Richardson P.C.

(57) ABSTRACT

Provided herein are a method for performing sidelink communication by a first device (100) and a device for supporting the same. The method may include the steps of performing at least one of Channel occupancy Ratio (CR) measurement or Channel Busy Ratio (CBR) measurement based on a first resource unit, and performing the sidelink communication based on the measurement, wherein a number of symbols of the first resource unit may be a number of symbols related with sidelink being included in a first slot, among a plurality of slots within a resource pool.

20 Claims, 31 Drawing Sheets

Related U.S. Application Data

(60) Provisional application No. 62/716,951, filed on Aug. 9, 2018.

(51) Int. Cl.
*H04L 1/18* (2006.01)
*H04W 24/10* (2009.01)
*H04W 72/04* (2009.01)
*H04W 92/18* (2009.01)

(52) U.S. Cl.
CPC ....... *H04W 24/10* (2013.01); *H04W 72/0446* (2013.01); *H04W 92/18* (2013.01)

(56) References Cited

U.S. PATENT DOCUMENTS

| | | | | |
|---|---|---|---|---|
| 2018/0249448 | A1* | 8/2018 | Yasukawa | H04W 28/06 |
| 2019/0342910 | A1* | 11/2019 | Cao | H04W 4/40 |
| 2019/0394786 | A1* | 12/2019 | Parron | H04L 27/0006 |
| 2020/0068534 | A1* | 2/2020 | Li | H04W 72/12 |
| 2020/0275458 | A1* | 8/2020 | Khoryaev | H04W 76/14 |
| 2020/0305176 | A1* | 9/2020 | Hu | H04W 72/1263 |

FOREIGN PATENT DOCUMENTS

| | | |
|---|---|---|
| WO | WO2018/027528 | 2/2018 |
| WO | WO2018/084556 | 5/2018 |
| WO | WO2018/084590 | 5/2018 |

OTHER PUBLICATIONS

LG Electronics, "Discussion on carrier aggregation in sidelink mode 4 operation", R1-1806581, 3GPP TSG RAN WG1 Meeting #93, Busan, Korea, May 21-25, 2018, 4 pages.

Nokia, Alcatel-Lucent Shanghai Bell, "On congestion control for V2V communication," R1-1609788, 3GPP TSG RAN WG1 Meeting #86bis, Lisbon, Portugal, Oct. 10-14, 2016, 2 pages.

Korean Notice of Allowance in Korean Appln No. 10-2020-7005373, dated Jul. 30, 2020, 6 pages (with English translation).

* cited by examiner

FIG. 9
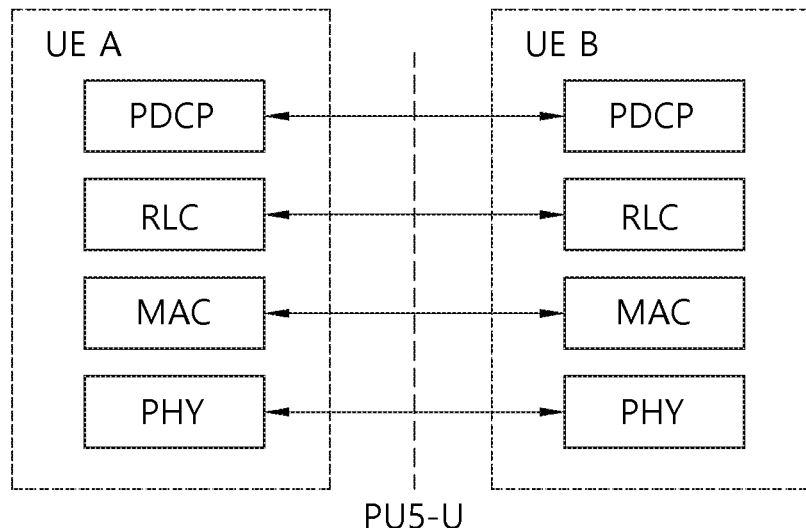
(a)
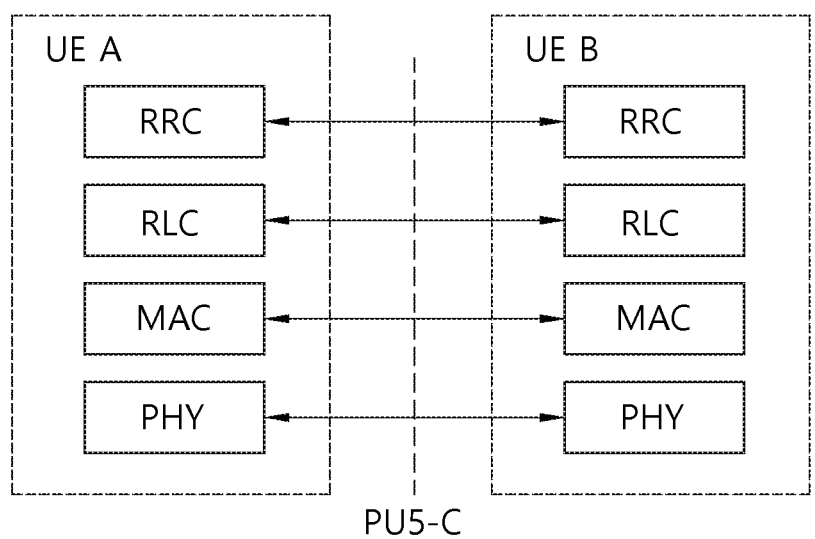
(b)

FIG. 10
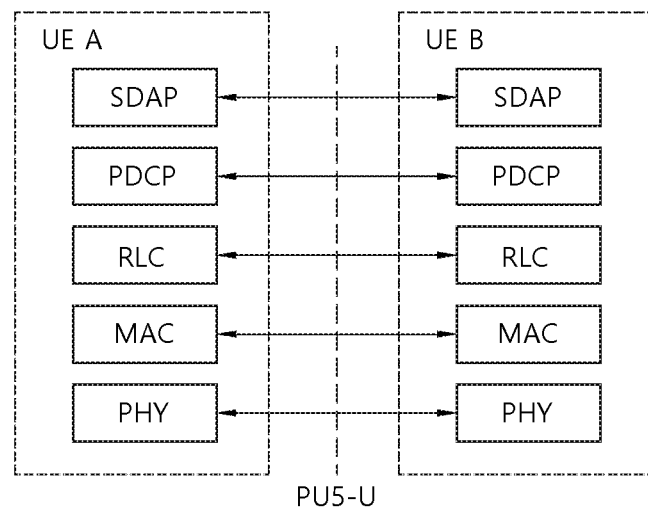
(a)
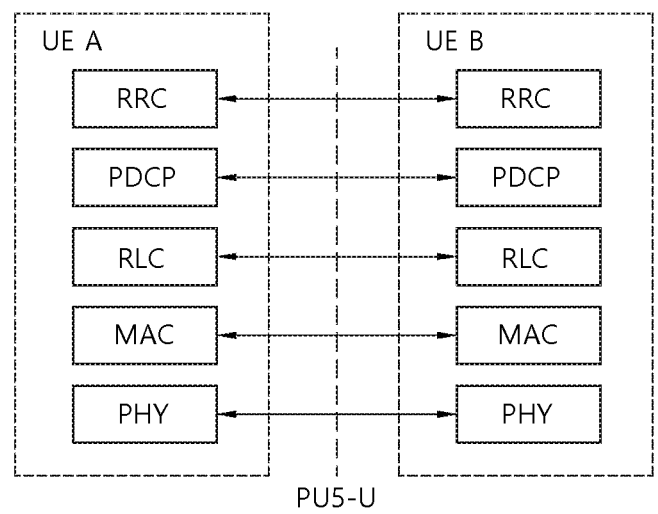
(b)

METHOD AND APPARATUS FOR PERFORMING CONGESTION CONTROL IN NR V2X

CROSS-REFERENCE TO RELATED APPLICATIONS

Pursuant to 35 U.S.C. § 119(e), this application is a continuation of International Application PCT/KR2019/010078, with an international filing date of Aug. 9, 2019, which claims the benefit of U.S. Provisional Patent Application No. 62/716,951 filed on Aug. 9, 2018, the contents of which are hereby incorporated by reference herein in its entirety.

BACKGROUND OF THE DISCLOSURE

Field of the Disclosure

The present disclosure relates to a wireless communication system.

Related Art

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Meanwhile, a wireless communication system may need to estimate an uplink channel or downlink channel to transmit/receive data, to achieve system synchronization, and to feedback channel information. In a wireless communication system environment, fading occurs by multipath time delay. A process of recovering a transmitted signal by compensating for a signal distortion caused by drastic environmental changes by fading is referred to as channel estimation. Further, it is needed to measure a channel state with respect to a cell to which a user equipment (UE) belongs or another cell. For channel estimation or channel state measurement, channel estimation is generally performed using a reference signal (RS) known between a transmitter and a receiver.

A UE may perform measurement using the following three methods.

1) Reference signal received power (RSRP): RSRP indicates the average received power of all resource elements (REs) carrying CRSs transmitted over the entire band. Here, the UE may measure the average received power of all REs carrying channel state information (CSI) RSs instead of CRSs.

2) Received signal strength indicator (RSSI): RSSI indicates received power measured over the entire band. RSSI includes all of a signal, interference, and thermal noise.

3) Reference symbol received quality (RSRQ): RSRQ indicates a channel quality indicator (CQI) and may be determined as RSRP/RSSI depending on a bandwidth or a sub-band. That is, RSRQ refers to signal-to-interference-plus-noise-ratio (SINR). Since RSRP does not provide sufficient mobility information, RSRQ may be used instead of RSRP in a handover or cell reselection process.

RSRQ may be calculated by RSSI/RSSP. Alternatively, RSRQ may be calculated by N*RSSI/RSSP. Here, N may be a parameter (for example, the number of PRBs) or a function related with a bandwidth in which RSSI is measured.

Meanwhile, sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Objects

Meanwhile, in case of NR sidelink or NR V2X, a flexible slot format is supported. Therefore, a sidelink communication method that is based on such flexible slot format and a device for supporting the same need to be proposed.

Technical Solutions

According to an embodiment, provided herein is a method for performing sidelink communication by a first device (100). The method may include the steps of performing at least one of Channel occupancy Ratio (CR) measurement or Channel Busy Ratio (CBR) measurement based on a first resource unit, and performing the sidelink communication based on the measurement, wherein a number of symbols of the first resource unit may be a number of symbols related with sidelink being included in a first slot, among a plurality of slots within a resource pool.

According to another embodiment, provided herein is a first device (100) for performing sidelink communication. The first device (100) may include one or more memories, one or more transceivers, and one or more processors operatively connecting the one or more memories and the one or more transceivers, wherein the processor may perform at least one of Channel occupancy Ratio (CR) measurement or Channel Busy Ratio (CBR) measurement based on a first resource unit, and may control the one or more transceivers so as to perform the sidelink communication based on the measurement, and wherein a number of symbols of the first resource unit may be a number of symbols related with sidelink being included in a first slot, among a plurality of slots within a resource pool.

EFFECTS OF THE DISCLOSURE

A user equipment (UE) may efficiently perform sidelink communication.

BRIEF DESCRIPTION OF THE DRAWINGS

FIG. 9 shows a protocol stack for a sidelink communication to which the exemplary embodiment of the present disclosure can be applied.

FIG. 10 shows a protocol stack for a sidelink communication to which the exemplary embodiment of the present disclosure can be applied.

DESCRIPTION OF EXEMPLARY EMBODIMENTS

In this document, the term "/" and "," should be interpreted to indicate "and/or". For instance, the expression "A/B" may mean "A and/or B". Further, "A, B" may mean "A and/or B". Further, "A/B/C" may mean "at least one of A, B, and/or C". Also, "A, B, C" may mean "at least one of A, B, and/or C".

Further, in the document, the term "or" should be interpreted to indicate "and/or". For instance, the expression "A or B" may comprise 1) only A, 2) only B, and/or 3) both A and B. In other words, the term "or" in this document should be interpreted to indicate "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A, which is a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
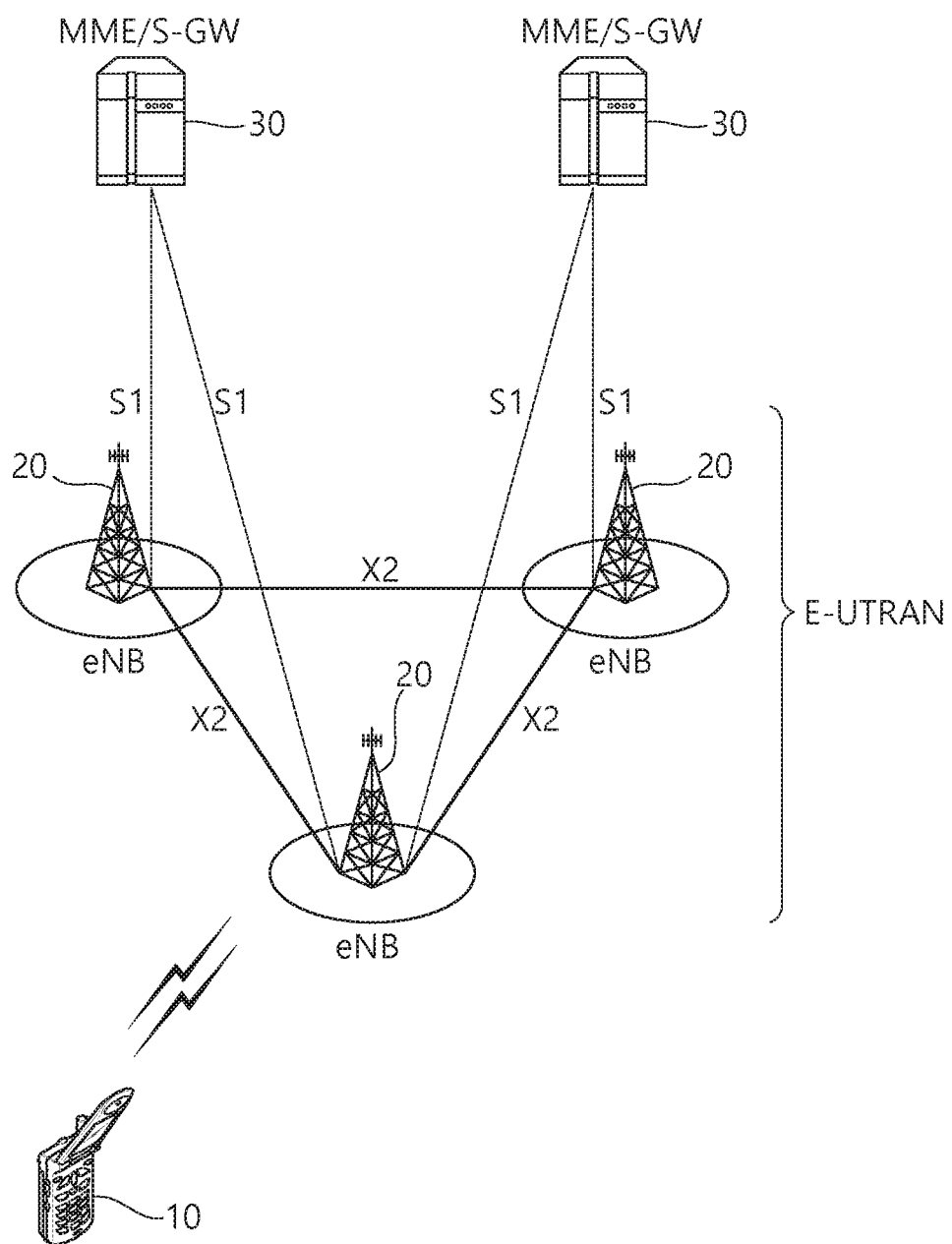
FIG. 1 shows a structure of an LTE system to which an exemplary embodiment of the present disclosure can be applied.

FIG. 1 shows a structure of an LTE system to which an exemplary embodiment of the present disclosure can be applied. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicated with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base station (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a PDN as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
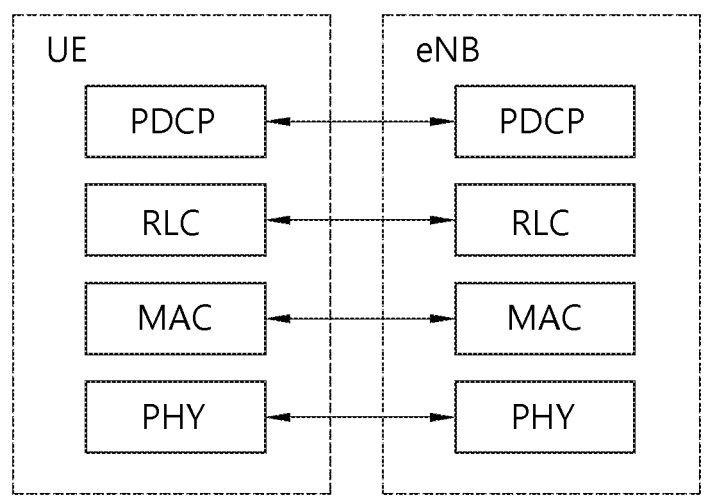
FIG. 2 shows a radio protocol architecture of a user plane to which an exemplary embodiment of the present disclosure can be applied.
Figure 3:
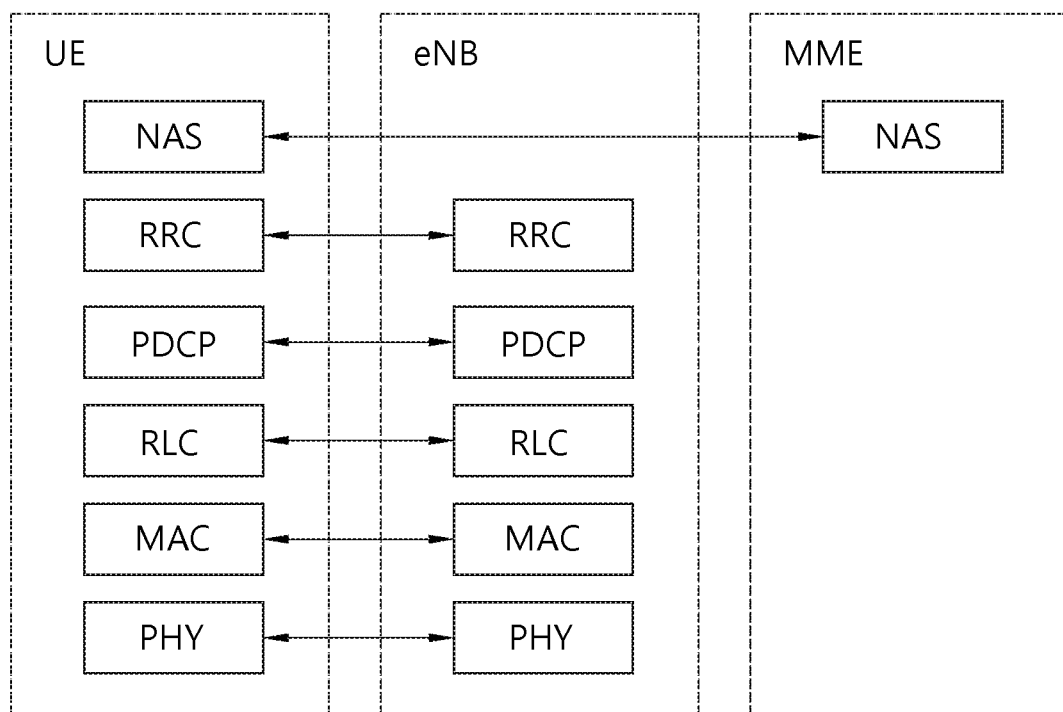
FIG. 3 shows a radio protocol architecture of a control plane to which an exemplary embodiment of the present disclosure can be applied.

FIG. 2 shows a radio protocol architecture of a user plane to which an exemplary embodiment of the present disclosure can be applied. FIG. 3 shows a radio protocol architecture of a control plane to which an exemplary embodiment of the present disclosure can be applied. The user plane is a protocol stack for user data transmission, and the control plane is a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of RLC SDU. In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, PDCP layer) in order to transport data between the UE and the network.

Functions of a Packet Data Convergence Protocol (PDCP) in the user plane include transfer, header compression, and ciphering of user data. Functions of a Packet Data Convergence Protocol (PDCP) in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in a RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
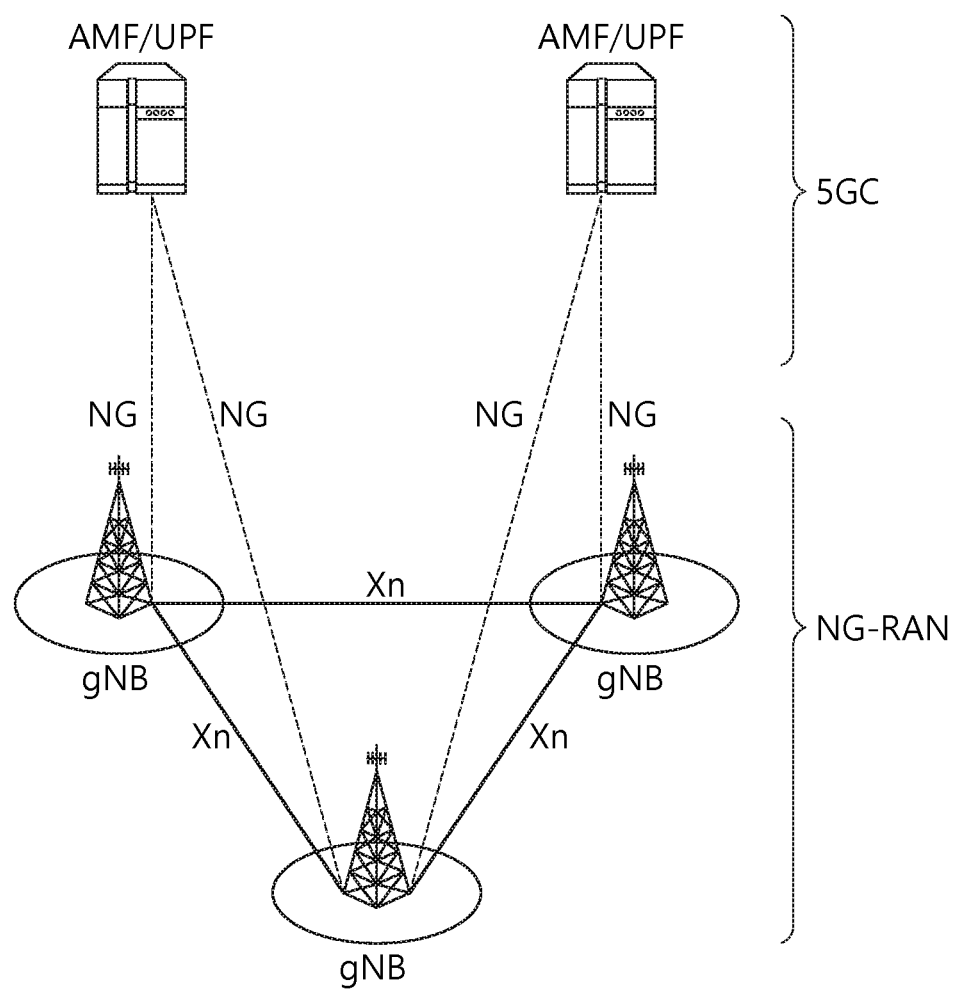
FIG. 4 shows a structure of an NR system to which an exemplary embodiment of the present disclosure can be applied.

FIG. 4 shows a structure of an NR system to which an exemplary embodiment of the present disclosure can be applied.

Referring to FIG. 4, an NG-RAN may include a gNB and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
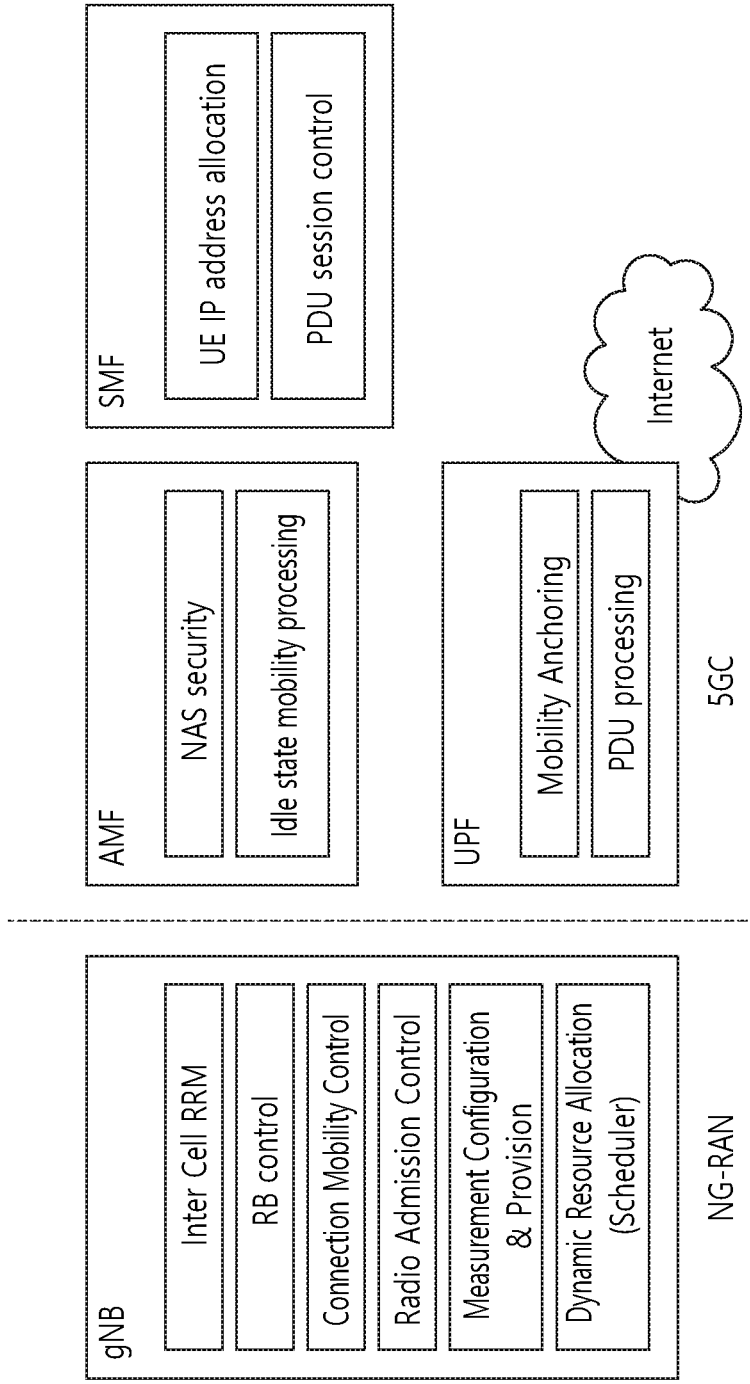
FIG. 5 shows a functional division between an NG-RAN and a 5GC to which an exemplary embodiment of the present disclosure can be applied.

FIG. 5 shows a functional division between an NG-RAN and a 5GC to which an exemplary embodiment of the present disclosure can be applied.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as NAS security, Idle state mobility processing, and so on. A UPF may provide functions, such as Mobility Anchoring, PDU processing, and so on. A Session Management Function (SMF) may provide functions, such as user equipment (UE) IP address allocation, PDU session control, and so on.

Figure 6:
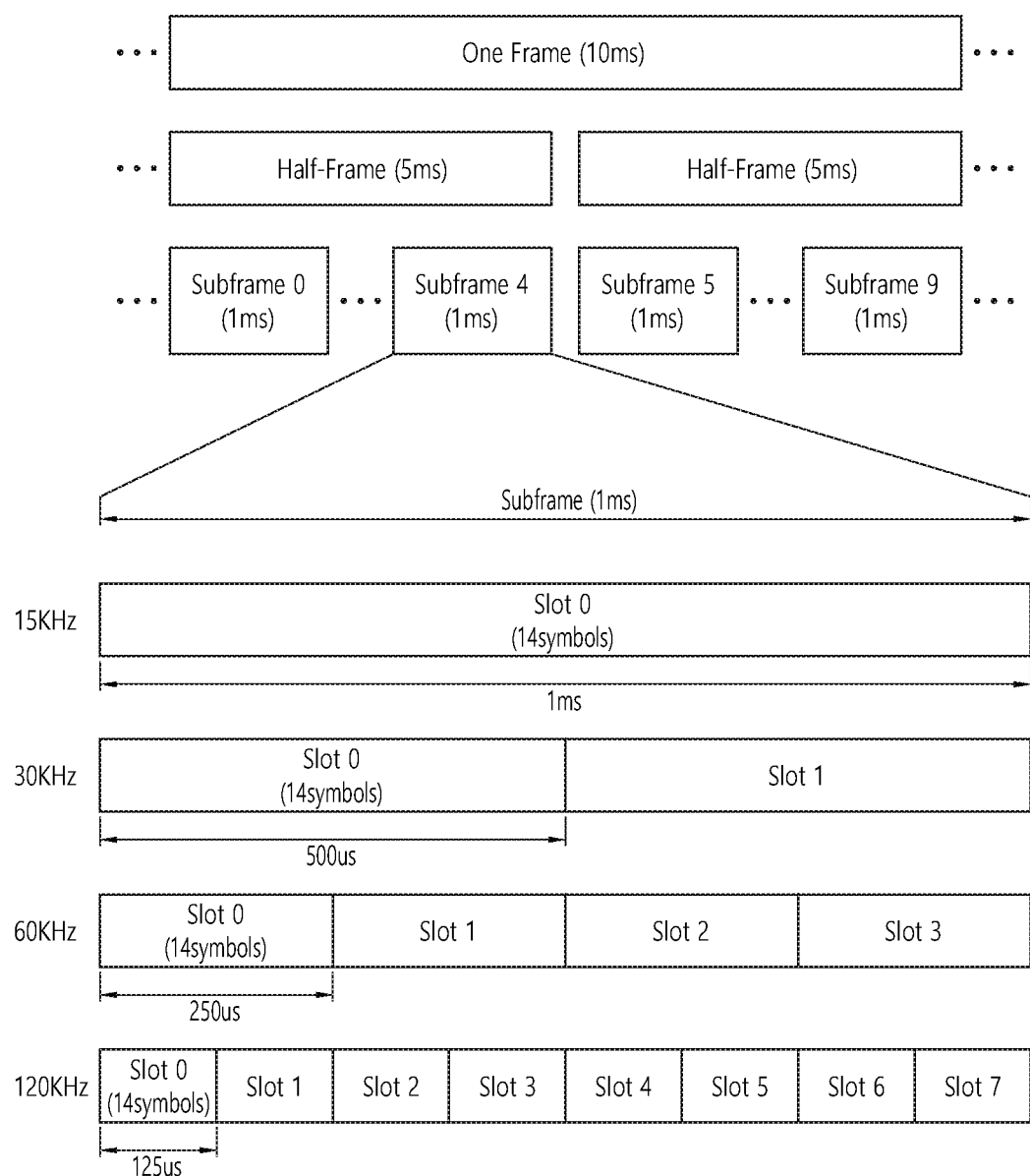
FIG. 6 shows a structure of a radio frame of an NR to which an exemplary embodiment of the present disclosure can be applied.

FIG. 6 shows a structure of a radio frame of an NR to which an exemplary embodiment of the present disclosure can be applied.

Referring to FIG. 6, in the NR, a radio frame may be used for performing uplink and downlink transmission. A radio frame has a length of 10 ms and may be defined to be configured of two half-frames (HFs). A half-frame may include five 1ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and an SC-FDMA symbol (or DFT-s-OFDM symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 7:
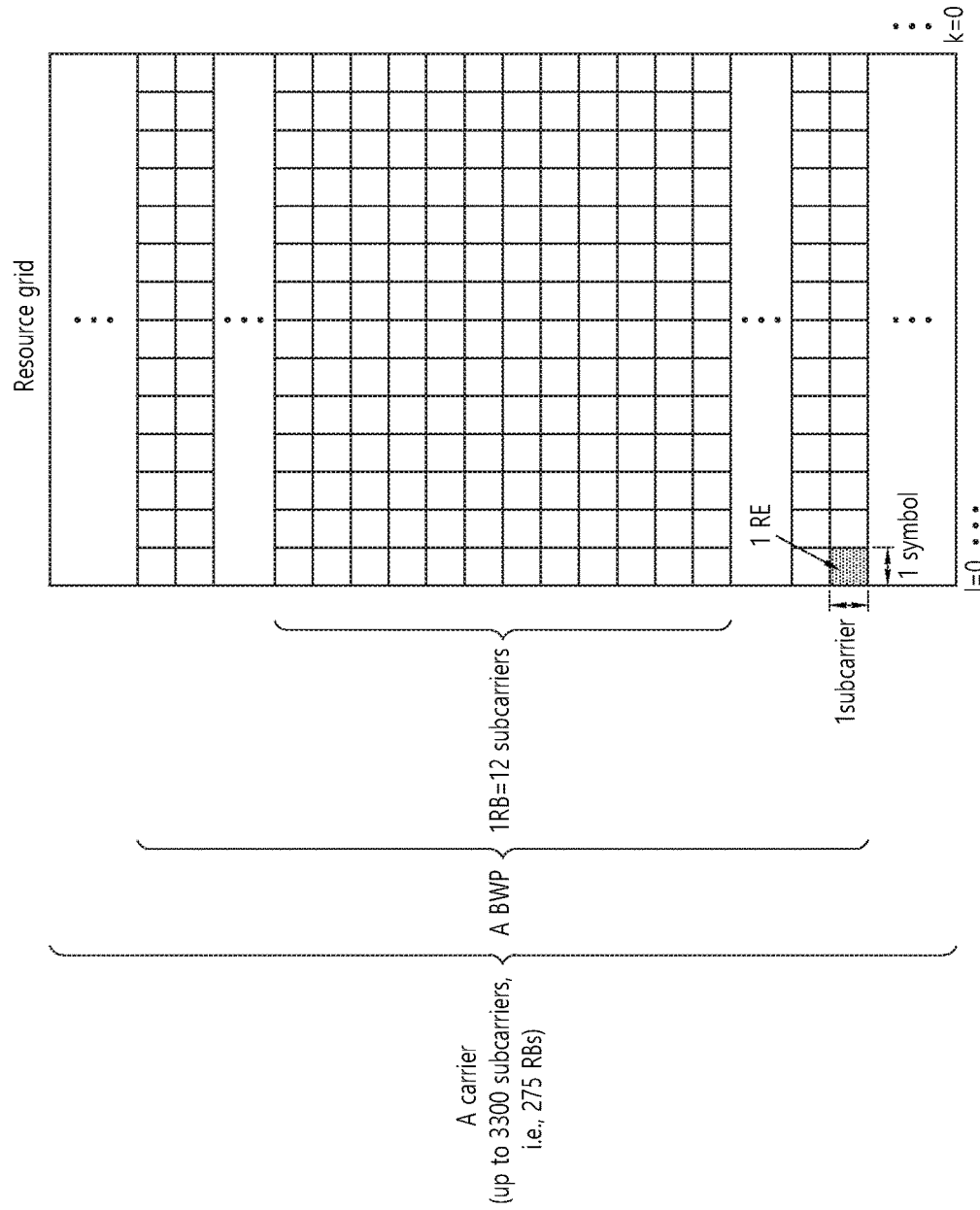
FIG. 7 shows a structure of a slot of an NR frame to which an exemplary embodiment of the present disclosure can be applied.

FIG. 7 shows a structure of a slot of an NR frame to which an exemplary embodiment of the present disclosure can be applied.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (P)RBs in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a Bandwidth Part (BWP) and a carrier will be described in detail.

The Bandwidth Part (BWP) may be a continuous set of physical resource blocks (PRBs) within a given numerology. The PRB may be selected from a continuous partial set of a common resource block (CRB) for a given numerology on a given carrier.

When using Bandwidth Adaptation (BA), a receiving bandwidth and a transmitting bandwidth of a user equipment (UE) are not required to be as wide (or large) as the bandwidth of the cell, and the receiving bandwidth and the transmitting bandwidth of the UE may be controlled (or adjusted). For example, the UE may receive information/configuration for bandwidth control (or adjustment) from a network/base station. In this case, the bandwidth control (or adjustment) may be performed based on the received information/configuration. For example, the bandwidth control (or adjustment) may include reduction/expansion of the bandwidth, position change of the bandwidth, or change in subcarrier spacing of the bandwidth.

For example, the bandwidth may be reduced during a duration with little activity in order to save power. For example, a position of the bandwidth may be relocated (or moved) from a frequency domain. For example, the position of the bandwidth may be relocated (or moved) from a frequency domain in order to enhance scheduling flexibility. For example, subcarrier spacing of the bandwidth may be changed. For example, the subcarrier spacing of the bandwidth may be changed in order to authorize different services. A subset of a total cell bandwidth of a cell may be referred to as a Bandwidth Part (BWP). BA may be performed when a base station/network configures BWPs to the UE, and when the base station/network notifies the BWP that is currently in an active state, among the BWPs, to the UE.

For example, the BWP may be one of an active BWP, an initial BWP, and/or a default BWP. For example, the UE may not monitor a downlink radio link quality in a DL BWP other than the active DL BWP within a primary cell (PCell). For example, the UE may not receive a PDCCH, a PDSCH or a CSI-RS (excluding only the RRM) from outside of the active DL BWP. For example, the UE may not trigger a Channel State Information (CSI) report for an inactive DL BWP. For example, the UE may not transmit a PUCCH or a PUSCH from outside of an inactive DL BWP. For example, in case of a downlink, an initial BWP may be given as a continuous RB set for an RMSI CORESET (that is configured by a PBCH). For example, in case of an uplink, an initial BWP may be given by a SIB for a random access procedure. For example, a default BWP may be configured by a higher layer. For example, an initial value of a default BWP may be an initial DL BWP. For energy saving, if the UE fails to detect DCI during a predetermined period of time, the UE may switch the active BWP of the UE to a default BWP.

Meanwhile, a BWP may be defined for the SL. The same SL BWP may be used for transmission and reception. For example, a transmitting UE may transmit an SL channel or SL signal within a specific BWP, and a receiving UE may receive an SL channel or SL signal within the same specific BWP. In a licensed carrier, the SL BWP may be defined separately from a Uu BWP, and the SL BWP may have a separate configuration signaling from the Uu BWP. For example, the UE may receive a configuration for an SL BWP from the base station/network. The SL BWP may be configured (in advance) for an out-of-coverage NR V2X UE and an R RC_IDLE UE. For a UE operating in the RRC_CONNECTED mode, at least one SL BWP may be activated within a carrier.

Figure 8:
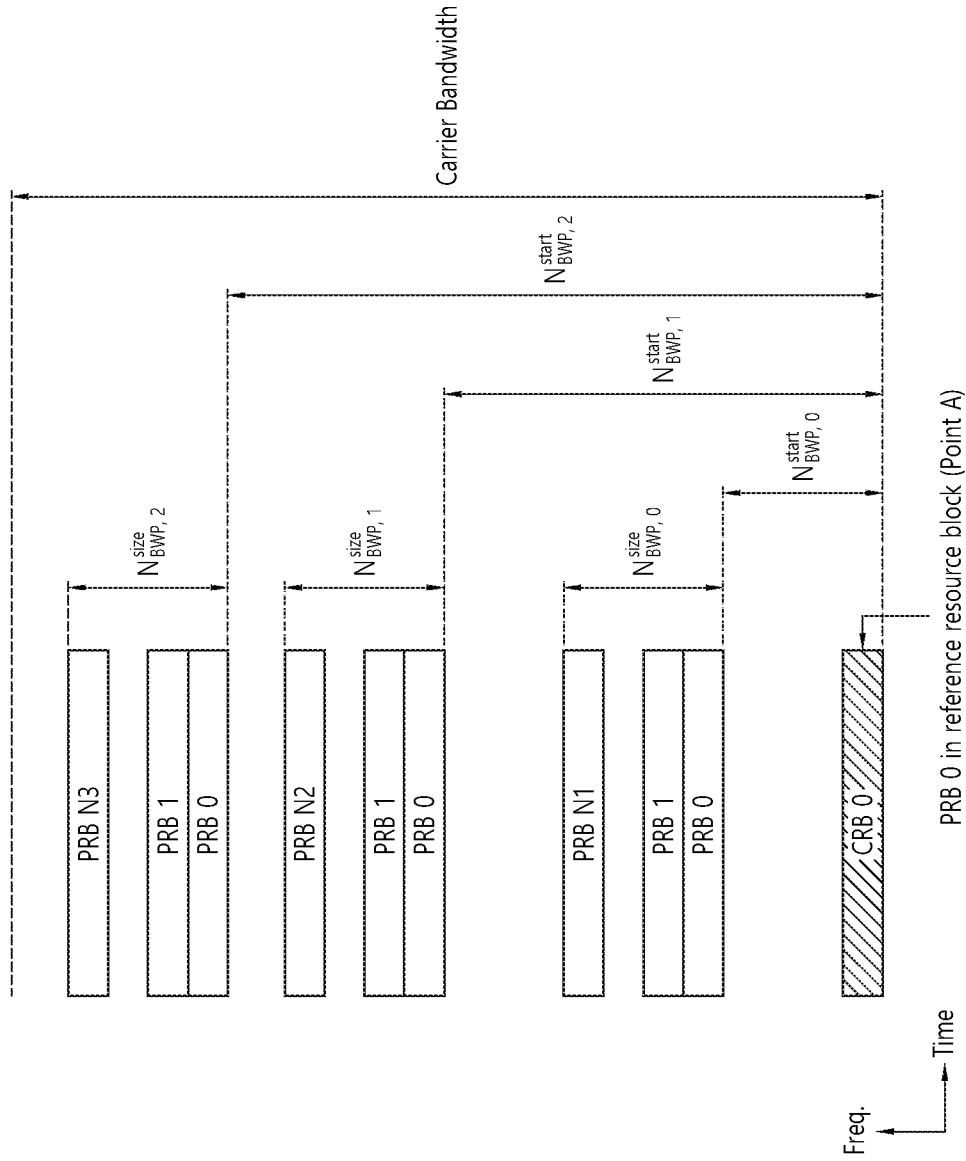
FIG. 8 shows an example of a BWP to which an embodiment of the present disclosure can be applied.

FIG. 8 shows an example of a BWP to which an embodiment of the present dis closure can be applied. In the embodiment of FIG. 8, it is assumed that three BWPs exist.

Referring to FIG. 8, a common resource block (CRB) may be a carrier resource block that is numerated from one end of a carrier band to another end. And, a PRB may be a resource block that is numerated within each BWP. Point A may indicate a common reference point for a resource block grid.

A BWP may be configured by Point A, an offset ($N^{start}_{BWP}$) from Point A, and a bandwidth ($N^{size}_{BWP}$). For example, Point A may be an external reference point of a PRB of a carrier having subcarrier 0 of all numerologies (e.g., all numerologies being supported by the network within the corresponding carrier) aligned therein. For example, the offset may be a PRB distance between a lowest subcarrier within a given numerology and Point A. For example, the bandwidth may be a number of PRBs within the given numerology.

Hereinafter, V2X or sidelink communication will be described in detail.

FIG. 9 shows a protocol stack for a sidelink communication to which the exemplary embodiment of the present disclosure can be applied. More specifically, (a) of FIG. 9 represents a user plane protocol stack of LTE, and (b) of FIG. 9 represents a control plane protocol stack of LTE.

FIG. 10 shows a protocol stack for a sidelink communication to which the exemplary embodiment of the present disclosure can be applied. More specifically, (a) of FIG. 10 represents a user plane protocol stack of NR, and (b) of FIG. 10 represents a control plane protocol stack of NR.

Hereinafter, Sidelink Synchronization Signal (SLSS) and synchronization information will be described in detail.

SLSS is a sidelink specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may be a (broadcast) channel through which basic (system) information that should first be known by the user equipment (UE) before transmitting and receiving sidelink signals is transmitted. For example, the basic information may be information related to SLSS, a Duplex mode (DM), TDD UL/DL configuration, information related to a resource pool, application types related to SLSS, a subframe offset, broadcast information, and so on.

The S-PSS, the S-SSS, and the PSBCH may be included in a block format (e.g., a sidelink SS/PSBCH block, hereinafter referred to as S-SSB). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL BWP. And, a frequency position of the S-SSB may be (pre-)configured. Therefore, the UE is not required to perform a hypothesis detection in order to discover the S-SSB in the carrier.

Each SLSS may have a physical layer sidelink synchronization identity (ID), and the respective value may be equal to any one value ranging from 0 to 335. Depending upon any one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer sidelink synchronization ID values, values 0 to 167 may be values being used by a network, and values from 168 to 335 may be values being used outside of the network coverage.

Figure 11:
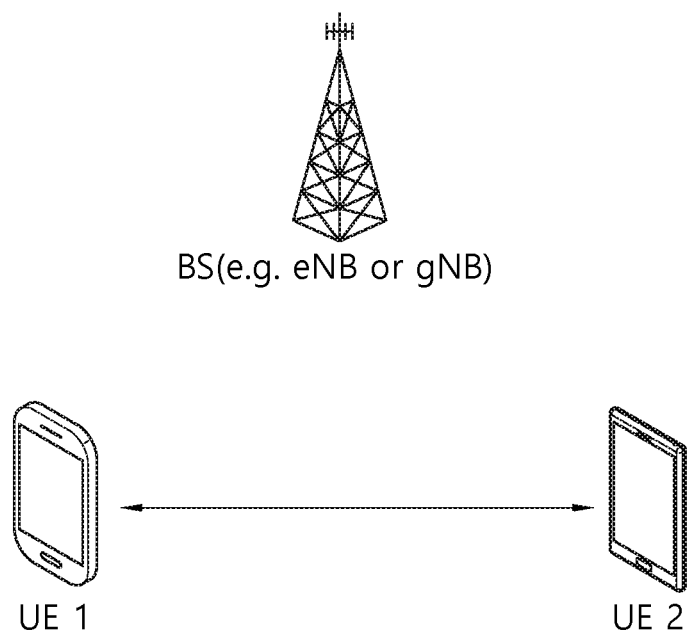
FIG. 11 shows a terminal performing V2X or sidelink communication to which an exemplary embodiment of the present disclosure can be applied.

FIG. 11 shows a terminal performing V2X or sidelink communication to which an exemplary embodiment of the present disclosure can be applied.

Referring to FIG. 11, in V2X/sidelink communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a sidelink signal by using the corresponding resource unit. User equipment 2 (UE2), which is a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its sidelink signal transmission.

Figure 12:
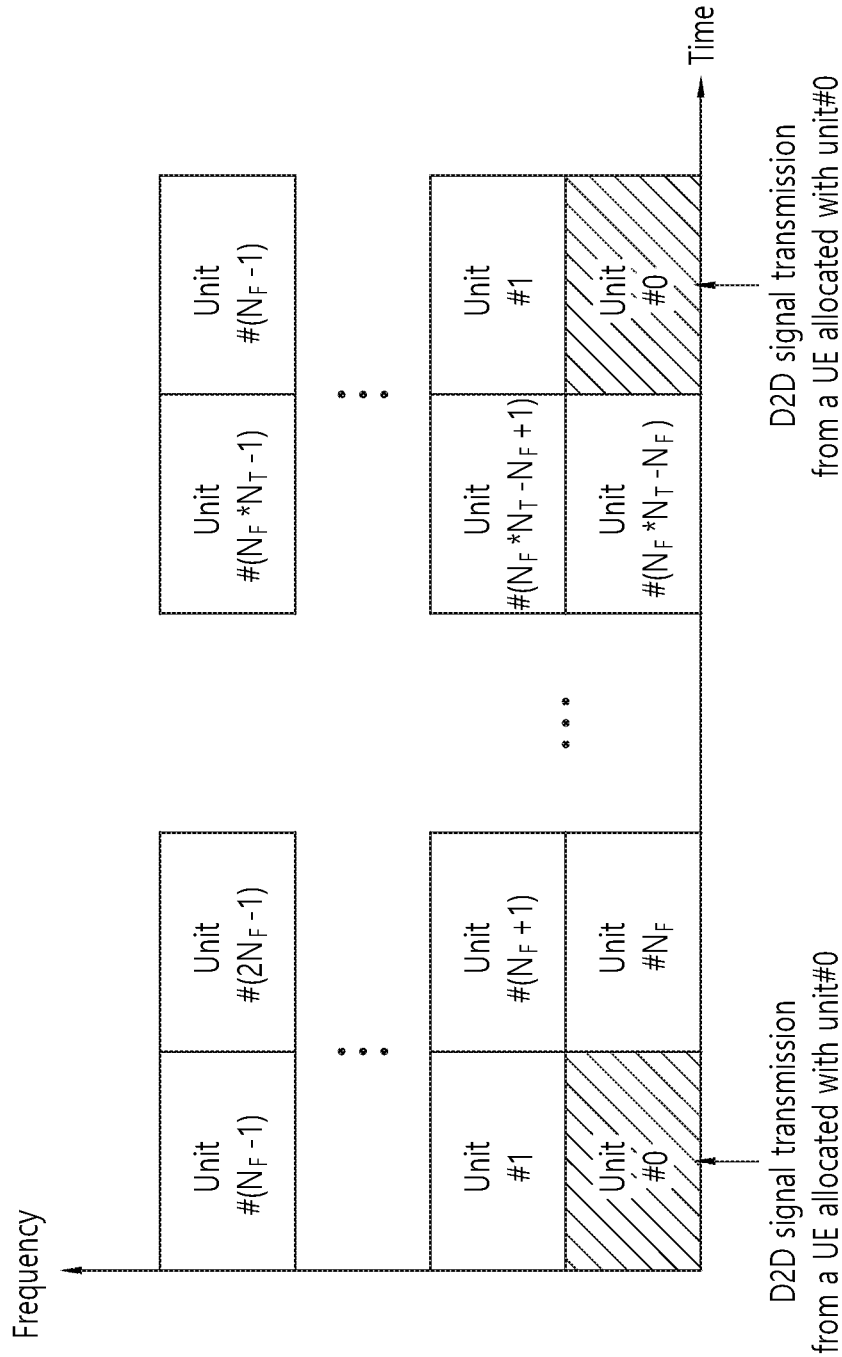
FIG. 12 shows an exemplary configuration of a resource unit to which an exemplary embodiment of the present disclosure can be applied.

FIG. 12 shows an exemplary configuration of a resource unit to which an exemplary embodiment of the present disclosure can be applied.

Referring to FIG. 12, the total frequency resources of the resource pool may be divided into $N_F$ number of resource units, the total time resources of the resource pool may be divided into $N_T$ number of resource units. Therefore, a total of $N_F*N_T$ number of resource units may be defined in the resource pool. FIG. 12 shows an example of a case where the corresponding resource pool is repeated at a cycle of NT number of subframes.

As shown in FIG. 12, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit sidelink signals.

The resource pool may be segmented to multiple types. For example, depending upon the content of a sidelink signal being transmitted from each resource pool, the resource pool may be divided as described below.

(1) Scheduling Assignment (SA) may be a signal including information, such as a position of a resource that is used for the transmission of a sidelink data channel, a Modulation and Coding Scheme (MCS) or MIMO transmission scheme needed for the modulation of other data channels, a Timing Advance (TA), and so on. The SA may also be multiplexed with sidelink data within the same resource unit and may then be transmitted, and, in this case, an SA resource pool may refer to a resource pool in which the SA is multiplexed with the sidelink data and then transmitted. The SA may also be referred to as a sidelink control channel.

(2) A Physical Sidelink Shared Channel (PSSCH) may be a resource pool that is used by a transmitting UE for transmitting user data. If the SA is multiplexed with sidelink data within the same resource unit and then transmitted, only a sidelink data channel excluding the SA information may be transmitted from the resource pool that is configured for the sidelink data channel. In other words, REs that were used for transmitting SA information within a separate resource unit of the SA resource pool may still be used for transmitting sidelink data from the resource pool of a sidelink data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described sidelink signal is the same, different resource pools may be used depending upon the transmission/reception attribute of the sidelink signal. For example, even if the same sidelink data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each sidelink signal within a subframe or a number of subframes being used for the transmission of one sidelink signal) of the sidelink signal, signal intensity from the base station, a transmitting power intensity (or level) of a sidelink UE, and so on.

Hereinafter, resource allocation in a sidelink will be described in detail.

Figure 13:
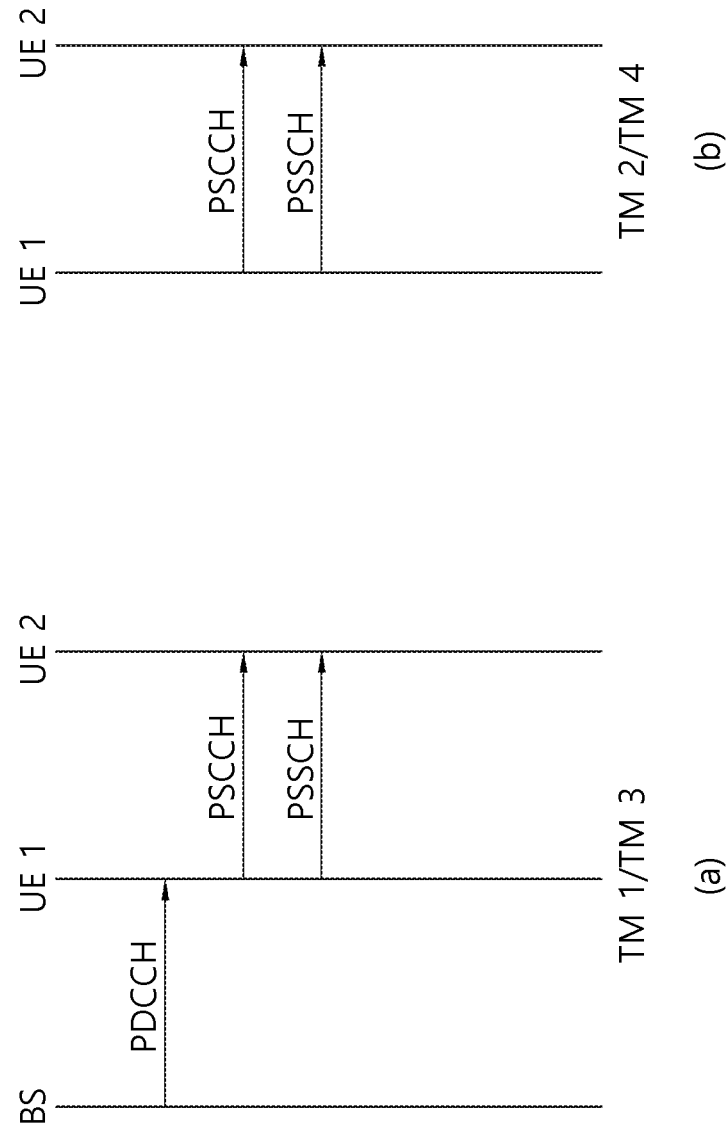
FIG. 13 shows user equipment (UE) operations according to a transmission mode (TM) being related to sidelink/V2X communication to which an exemplary embodiment of the present disclosure can be applied.

FIG. 13 shows user equipment (UE) operations according to a transmission mode (TM) being related to sidelink/V2X communication to which an exemplary embodiment of the present disclosure can be applied.

(a) of FIG. 13 represents UE operations being related to transmission mode 1 or transmission mode 3, and (b) of FIG. 13 represents UE operations being related to transmission mode 2 or transmission mode 4.

Referring to (a) of FIG. 13, in transmission modes 1/3, the base station performs resource scheduling to UE1 via PDCCH (more specifically, DCI), and UE1 performs sidelink/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE sidelink, transmission mode 1 may be applied to a general sidelink communication, and transmission mode 3 may be applied to a V2X sidelink communication.

Referring to (b) of FIG. 13, in transmission modes 2/4, the UE may schedule resources on its own. More specifically, in case of LTE sidelink, transmission mode 2 may be applied to a general sidelink communication, and the UE may select a resource from a predetermined resource pool on its own and may then perform sidelink operations. Transmission mode 4 may be applied to a V2X sidelink communication, and the UE may carry out a sensing/SA decoding procedure, and so on, and select a resource within a selection window on its own and may then perform V2X sidelink operations. After transmitting the SCI to UE2 via PSCCH, UE1 may transmit SCI-based data via PSSCH. Hereinafter, the transmission mode may be abbreviated to mode.

In case of NR sidelink, at least two types of sidelink resource allocation modes may be defined. In case of mode 1, the base station may schedule sidelink resources that are to be used for sidelink transmission. In case of mode 2, the user equipment (UE) may determine a sidelink transmission resource from sidelink resources that are configured by the base station/network or predetermined sidelink resources. The configured sidelink resources or the pre-determined sidelink resources may be a resource pool. For example, in case of mode 2, the UE may autonomously select a sidelink resource for transmission. For example, in case of mode 2, the UE may assist (or help) sidelink resource selection of another UE. For example, in case of mode 2, the UE may be configured with an NR configured grant for sidelink transmission. For example, in case of mode 2, the UE may schedule sidelink transmission of another UE. And, mode 2 may at least support reservation of sidelink resources for blind retransmission.

Procedures related to sensing and resource (re-)selection may be supported in resource allocation mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL RSRP measurement, which is based on SL DMRS. The resource (re-)selection procedure may use a result of the sensing procedure in order to determine the resource for the sidelink transmission.

Figure 14:
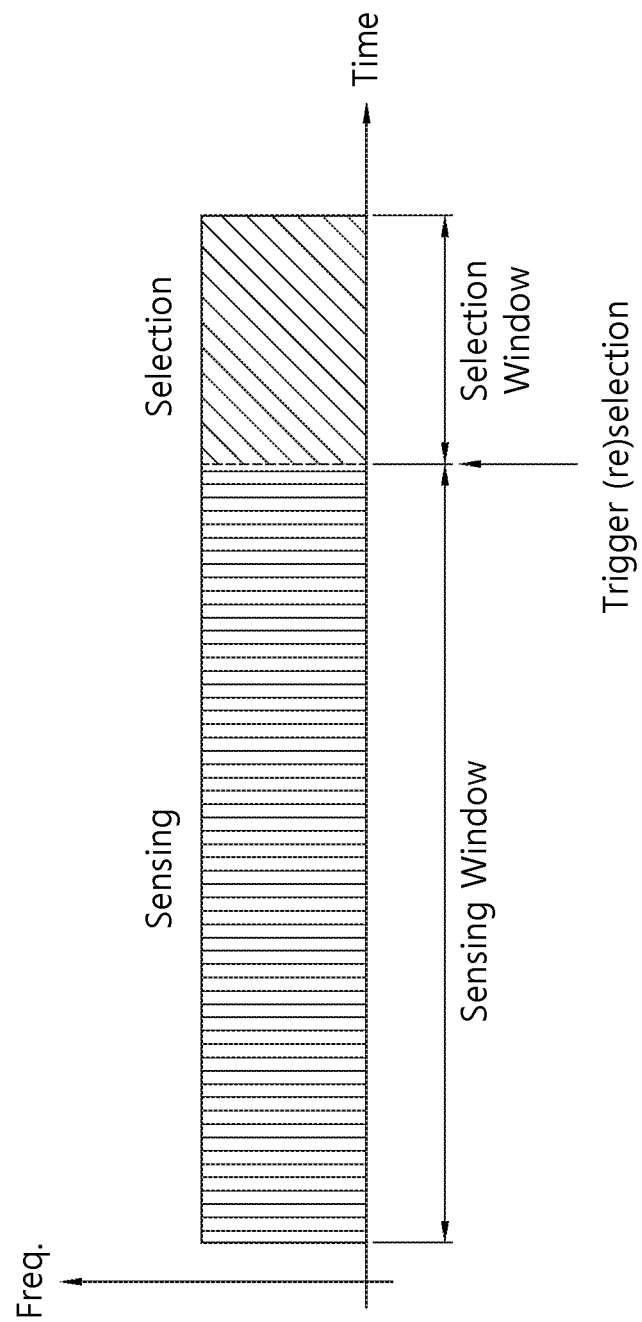
FIG. 14 shows an example where a transmission resource to which an exemplary embodiment of the present disclosure can be applied.

FIG. 14 shows an example where a transmission resource to which an exemplary embodiment of the present disclosure can be applied.

Referring to FIG. 14, the UE may identify transmission resources reserved by another UE or resources being used by another UE via sensing within a sensing window, and, after excluding the identified resources from a selection window, the UE may randomly select a resource from resources having low interference among the remaining resources.

For example, within the sensing window, the UE may decode the PSCCH including information on the cycles of the reserved resources, and, then, the UE may measure a PSSCH RSRP from resources that are periodically determined based on the PSCCH. The UE may exclude resources having the PSSCH RSRP that exceed a threshold value from the selection window. Thereafter, the UE may randomly select a sidelink resource from the remaining resources within the selection window.

Alternatively, the UE may measure a Received signal strength indication (RSSI) of the periodic resources within the sensing window and may then determine the resources having low interference (e.g., the lower 20% of the resources). Additionally, the UE may also randomly select a sidelink resource from the resources included in the selection window among the periodic resources. For example, in case the UE fails to perform decoding of the PSCCH, the UE may use the above described methods.

Hereinafter, sidelink congestion control will be described in detail.

In case a user equipment (UE) autonomously determines its sidelink transmission resource, the UE may also autonomously determine a size and frequency of the resource it is using. Evidently, due to restrictive conditions from a network, and so on, there may exist some restrictions in using a resource size or frequency exceeding a predetermined level. However, in a situation where a large number of UEs are concentrated in a specific area at a specific time point, and in case all of the UEs are using a relatively large number of resources, the overall performance (or capability) may be largely degraded due to interference occurring between the UEs.

Therefore, the UE needs to observe the channel situation. If the UE determines that an excessively large number of resources are being consumed (or used), it is preferable for the UE to perform actions, such as reducing its own usage of resources. In this specification, this may be defined as Congestion Control (CR). For example, the UE determines whether or not energy measured from a unit time/frequency resource exceeds a predetermined energy level. And, then, the UE may adjust the size (or amount) and frequency of its transmission resources in accordance with a ratio of the unit time/frequency resources that are observed to have energy levels exceeding a predetermined level. In this specification, the ratio of the unit time/frequency resources that are observed to have energy levels exceeding a predetermined level may be defined as a Channel Busy Ratio (CBR). The UE may measure a CBR for each channel/frequency. Additionally, the UE may transmit the measured CBR or a network/base station.

Figure 15:
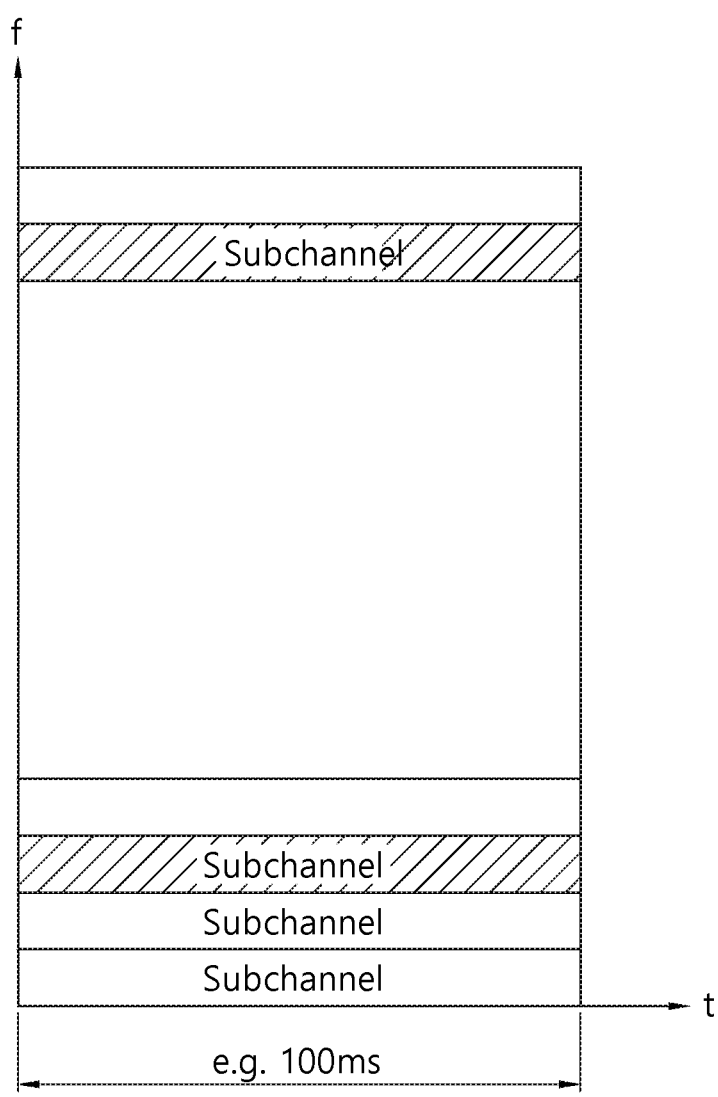
FIG. 15 shows an example of a CBR to which an exemplary embodiment of the present disclosure can be applied.

FIG. 15 shows an example of a CBR to which an exemplary embodiment of the present disclosure can be applied.

Referring to FIG. 15, as a result of measuring a Received Signal Strength Indicator (RSSI) in subchannel units for a period of 100 ms, the CBR may mean a number of subchannels having RSSI measurement result values that are greater than or equal to a predetermined threshold value. Alternatively, the CBR may mean a ratio of subchannels having values that are greater than or equal to a predetermined threshold value, among subchannels during a predetermined duration (or time period). For example, in the embodiment of FIG. 15, in case it is assumed that subchannels marked in slanting lines are subchannels having values that are greater than or equal to a predetermined threshold value, the CBR may mean a ratio of subchannels marked in slanting lines during a duration (or time period) of 100 ms.

Further, congestion control that is based on priority levels of traffic (e.g., packets) may be needed. More specifically, each UE may measure a CBR and may then determine a maximum value (CRlimitk) of a channel occupancy ratio k (CRk) of channels that can be occupied by each traffic priority level (e.g., k) according to the CBR. For example, based on the CBR measurement values and a predetermined table, the UE may derive a maximum value (CRlimitk) of a channel occupancy ratio for the priority levels of each traffic. In case of a traffic having a relatively higher priority level, a maximum value of a greater channel occupancy ratio may be derived. Thereafter, by restricting a total sum of channel occupancy ratios of traffics having priority levels k that are lower than i to less than or equal to a predetermined value, the UE may perform congestion control. According to this method, a more reinforced restriction in the channel occupancy ratio may be applied to traffic having relatively lower priority levels.

Apart from this, the UE may also perform sidelink congestion control by using methods, such as adjusting transmission power size (or level), dropping packets, determining whether or not to perform re-transmission, adjusting transmission RB size (controlling MCS), and so on.

Meanwhile, in an NR system, the UE may receive information on a slot format. For example, an in-coverage UE may receive Subcarrier Spacing and TDD DL/UL patterns from the base station. The TDD DL/UL pattern may include a DL/UL transmission cycle, a number of consecutive DL slots, a number of consecutive DL symbols, a number of consecutive UL slots, and a number of consecutive UL symbols. In this case, based on the information on the slot format, it will be apparent that the UE has a same slot format as FIG. 16.

Figure 16:
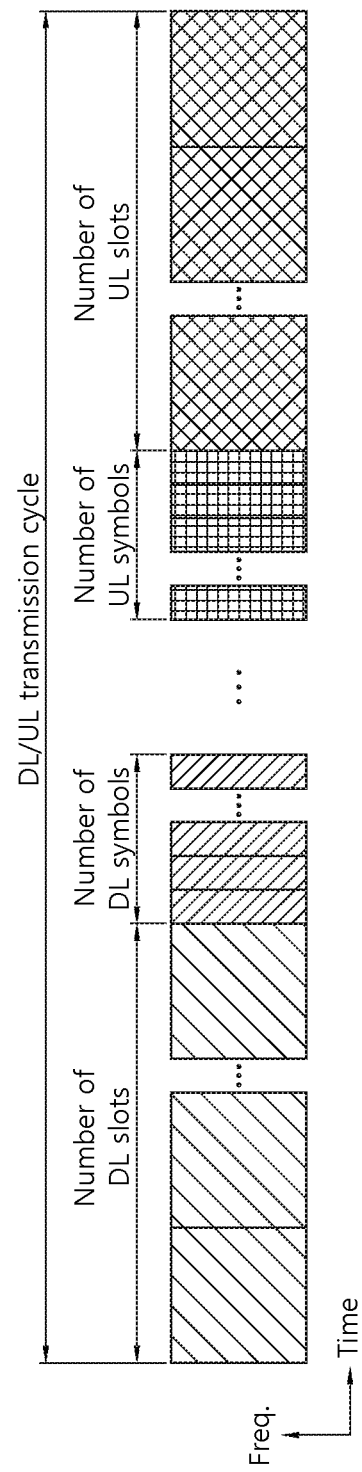
FIG. 16 shows an example of a slot format to which an exemplary embodiment of the present disclosure can be applied.

FIG. 16 shows an example of a slot format to which an exemplary embodiment of the present disclosure can be applied.

As shown in the embodiment of FIG. 16, in case of an NR system, a flexible slot format may be configured. Therefore, for example, in case of an NR system, a number of symbols configuring each of the UL/DL/FLEXIBLE resources within a slot may be configured to be partly or entirely different between slots or BWPs.

Therefore, for example, under an in-coverage environment, in case a V2X resource pool is configured for (part of) UL resources, the number of symbols within a SL slot (configuring the V2X resource pool) may be different among the slots. Additionally, for example, in case a V2X resource pool is configured under an out-of-coverage environment, the number of symbols within a SL slot may be different among the slots. For example, in case a V2X resource pool is configured under an out-of-coverage environment without considering UL resources, the number of symbols within a SL slot may be different among the slots. For example, depending upon which SL slot is being selected among the UEs, even if a UE uses only one subchannel, the (actual) number of resources being used may be different.

In this specification, a SL slot may include at least one of a slot in which a UE is capable of performing sidelink communication, a slot in which a UE is capable of performing V2X communication, a slot having a resource pool for sidelink configured therein, and/or a slot having a resource pool for V2X configured therein. In this specification, a SL symbol may include at least one of a slot in which a UE is capable of performing sidelink communication, a slot in which a UE is capable of performing V2X communication, a symbol being related to sidelink communication, and/or a symbol being related to sidelink. For example, a SL symbol may include at least one of a UL symbol and/or a FLEXIBLE (F) symbol.

For example, based on service types related to transmission messages, requirements (e.g., reliability and/or latency), target coverage, and/or waveforms related to transmission channels, and so on, in case multiple transmitting UEs select and/or control a number of symbols (e.g., a number of transmission symbols or a number of SL symbols) within each SL slot, even if each of the multiple transmitting UEs uses one subchannel within the (same) SL slot(s), the (actual) number of resources being used by the multiple UEs may be different among the multiple UEs.

For example, based on service types related to transmission messages, requirements, target coverage, and/or waveforms related to transmission channels, and so on, in case multiple transmitting UEs select a numerology (e.g., sub-carrier spacing), a number of transmissions being performed by the multiple UEs within a given time (e.g., 1 ms) may be different among the multiple UEs. Alternatively, for example, based on service types related to transmission messages, requirements, target coverage, and/or waveforms related to transmission channels, and so on, in case multiple transmitting UEs select a numerology (e.g., subcarrier spacing), a number of resources being used by the multiple UEs within a given time (e.g., 1 ms) may be different among the multiple UEs.

As described above, even if the multiple UEs use one subchannel within an SL slot or within the same slot, the number of resources being used by the multiple UEs, the number of transmissions being performed by the multiple UEs within a given time, and/or the number of resources being used by the multiple UEs within a given time may be different among the multiple UEs. Accordingly, in the aspect of multiple UEs, a method for fairly or efficiently performing CR and/or CBR measurement may be needed.

Hereinafter, according to an embodiment of the present disclosure, a method for performing, by a UE, CR measurement and/or CBR measurement based on a resource unit and a device for supporting the same will be described in detail.

In this specification, a sidelink RSSI may be defined as the linear average of the total received power (in [W]) per SC-FDMA symbol observed by the UE only in the configured subchannel in SC-FDMA symbols 1, 2, . . . , 6 of the first slot and SC-FDMA symbols 0,1, . . . , 5 of the second slot of a subframe. In this specification, a PSSCH Reference Signal Received Power (PSSCH-RSRP) may be defined as the linear average over the power contributions (in [W]) of the resource elements that carry demodulation reference signals related with PSSCH, within the PRBs indicated by the associated PSCCH.

In this specification, receiving operations of a UE may include decoding operations and/or receiving operations of a sidelink channel and/or sidelink signal (e.g., PSCCH, PSSCH, PSFCH, PSBCH, PSSS/SSSS, and so on). Receiving operations of a UE may include decoding operations and/or receiving operations of a WAN DL channel and/or a WAN DL signal (e.g., PDCCH, PDSCH, PSS/SSS, and so on). Receiving operations of a UE may include sensing operations and/or CBR measurement operations. In this specification, sensing operations of a UE may include a PSSCH-RSRP measurement operation based on a PSSCH DM-RS sequence, a PSSCH-RSRP measurement operation based on a PSSCH DM-RS sequence, which is scheduled by a PSCCH that is successfully decoded by the UE, a sidelink RSSI (S-RSSI) measurement operation, and/or a S-RSSI measurement operation based on a subchannel related with a V2X resource pool. In this specification, transmitting operations of the UE may include transmitting operations of a sidelink channel and/or sidelink signal (e.g., PSCCH, PSSCH, PSFCH, PSBCH, PSSS/SSSS, and so on). Transmitting operations of the UE may include transmitting operations of a WAN UL channel and/or a WAN UL signal (e.g., PUSCH, PUCCH, SRS, and so on). In this specification, a synchronization signal may include a SLSS and/or PSBCH.

In this specification, configuration may include signaling, signaling from a network, configuration from a network, and/or a pre-configuration from a network. In this specification, definition may include signaling, signaling from a network, configuration from a network, and/or a pre-configuration from a network. In this specification, designation may include signaling, signaling from a network, configuration from a network, and/or a pre-configuration from a network. In this specification, PPPP may be replaced with PPPR, and PPPR may be replaced with PPPP. In this specification, as the PPPP value becomes smaller, this may indicate a high priority level, and, as the PPPP value becomes greater, this may indicate a low priority level. In this specification, as the PPPP value becomes smaller, this may indicate a high reliability level, and, as the PPPP value becomes greater, this may indicate a low reliability level.

Part or all of the method proposed in this specification may be limited to transmitting operations of a UE, transmission carrier selecting operation, and/or transmission BWP selecting operation. Alternatively, for example, part or all of the method proposed in this specification may be limited to receiving operations of a UE, reception carrier selecting operation, and/or reception BWP selecting operation.

At least one of the proposed methods proposed in this specification may not only be applied to sidelink communication or V2X communication based on a PC5 interface or a SL interface (e.g., PSCCH, PSSCH, PSBCH, PSSS/SSSS, and so on) but may also be applied to sidelink communication or V2X communication based on a Uu interface (e.g., PUSCH, PDSCH, PDCCH, PUCCH, and so on).

Figure 17:
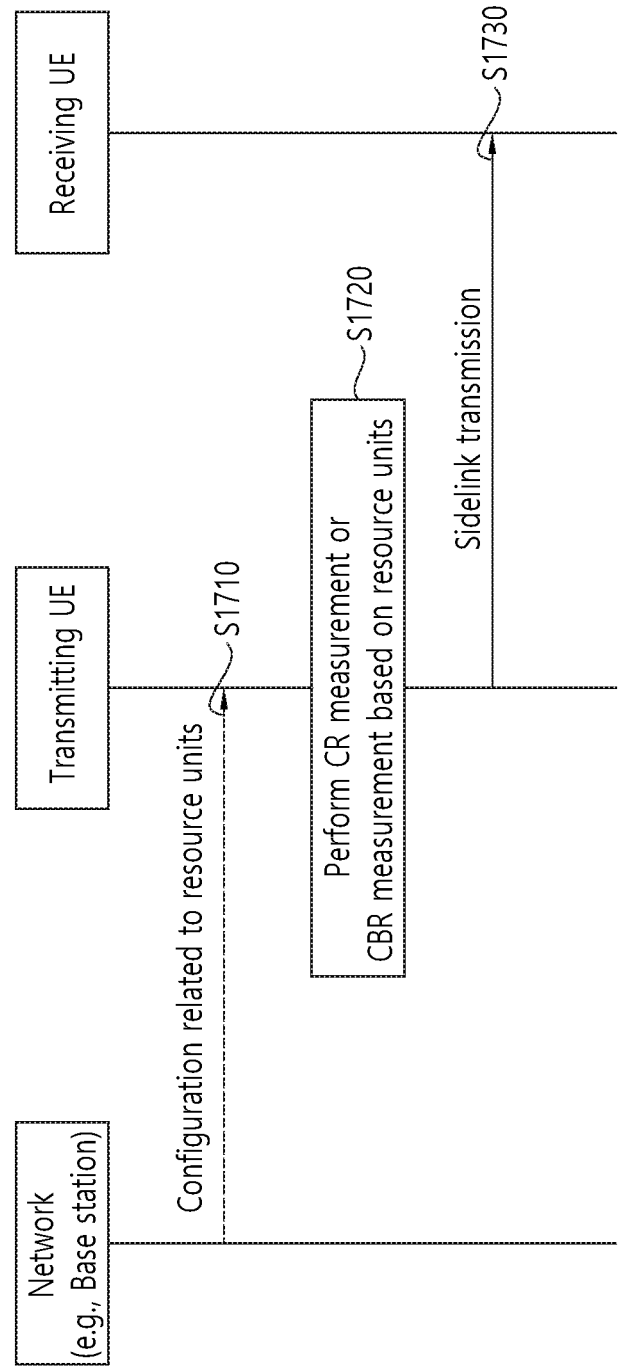
FIG. 17 shows a method for performing, by a UE, CR measurement or CBR measurement based on a basic resource unit according to an exemplary embodiment of the present disclosure.

FIG. 17 shows a method for performing, by a UE, CR measurement or CBR measurement based on a basic resource unit according to an exemplary embodiment of the present disclosure.

Referring to FIG. 17, in step S1710, the UE may receive configurations for a basic resource unit from a network (e.g., base station). For example, the basic resource unit may be configured for the UE or may be pre-configured in advance. For example, the basic resource unit may be used in CR measurement and/or CBR measurement. For example, the basic resource unit may be configured in time and/or frequency units. For example, the basic resource unit may include one or more symbols and one or more subcarriers. Alternatively, for example, a basic resource unit and/or a basic numerology (e.g., subcarrier spacing) may be configured for the UE or may be pre-configured in advance. Alternatively, for example, a basic resource unit and/or a basic numerology (e.g., subcarrier spacing) that is to be used in CR measurement and/or CBR measurement may be pre-configured in advance for the UE.

In this specification, for simplicity in the description, the basic resource unit and/or the basic numerology may be referred to as BASIC_CUN. Herein, for example, BASIC_CUN may be independently or differently configured in accordance with a V2X resource pool, a BWP, a service type, a PPPP, a PPPR, and/or a numerology.

Figure 18:
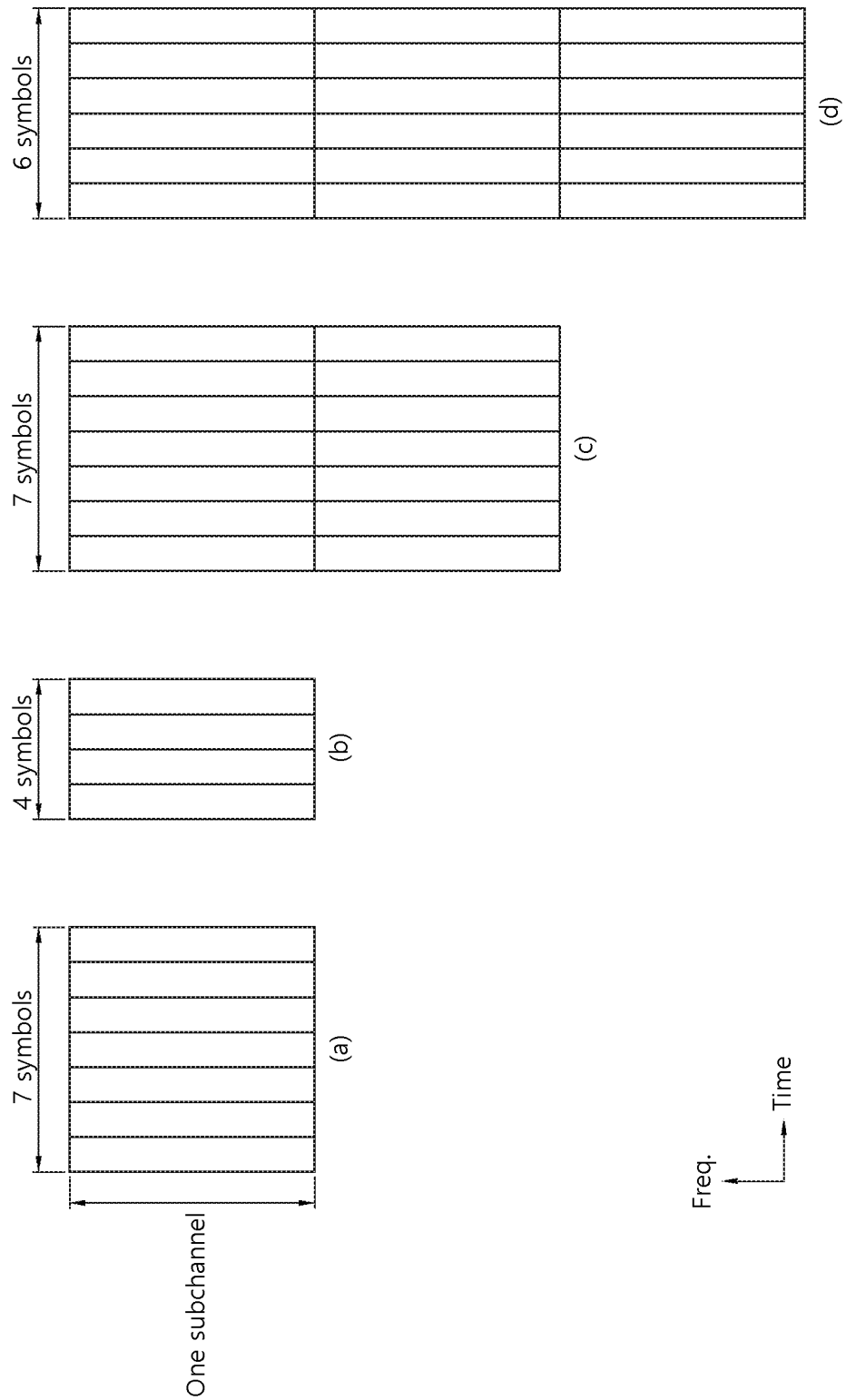
FIG. 18 shows an example of a basic resource unit according to an exemplary embodiment of the present disclosure.

FIG. 18 shows an example of a basic resource unit according to an exemplary embodiment of the present disclosure.

Referring to (a) of FIG. 18, BASIC_CUN may be configured as one subchannel being configured of 7 symbols. For example, BASIC_CUN may be configured as one subchannel including 7 symbols. Referring to (b) of FIG. 18, BASIC_CUN may be configured as one subchannel being configured of 4 symbols. For example, BASIC_CUN may be configured as one subchannel including 4 symbols. Referring to (c) of FIG. 18, BASIC_CUN may be configured as two subchannels each being configured of 7 symbols. For example, BASIC_CUN may be configured as two subchannels each including 7 symbols. Referring to (d) of FIG. 18, BASIC_CUN may be configured as three subchannels each being configured of 6 symbols. For example, BASIC_CUN may be configured as three subchannels each including 6 symbols. The embodiments of FIG. 18 are merely exemplary, and, therefore, the BASIC_CUN may be configured or defined by other various methods.

For example, BASIC_CUN may be configured as a smallest amount (or number) of (time and/or frequency) resource units that may be selected for SL transmission within a V2X resource pool. For example, BASIC_CUN may be configured as a largest amount (or number) of (time and/or frequency) resource units that may be selected for SL transmission within a V2X resource pool.

For example, BASIC_CUN may be configured as a smallest amount (or number) of (time and/or frequency) resource units and/or a largest numerology (e.g., subcarrier spacing) that may be selected for SL transmission within a V2X resource pool. For example, BASIC_CUN may be configured as a smallest amount (or number) of (time and/or frequency) resource units and/or a smallest numerology (e.g., subcarrier spacing) that may be selected for SL transmission within a V2X resource pool. For example, BASIC_CUN may be configured as a largest amount (or number) of (time and/or frequency) resource units and/or a largest numerology (e.g., subcarrier spacing) that may be selected for SL transmission within a V2X resource pool. For example, BASIC_CUN may be configured as a largest amount (or number) of (time and/or frequency) resource units and/or a smallest numerology (e.g., subcarrier spacing) that may be selected for SL transmission within a V2X resource pool.

For example, BASIC_CUN may be configured as a subchannel on a SL slot being configured of a smallest number of symbols. For example, BASIC_CUN may be configured as a subchannel on a SL slot being configured of a largest number of symbols. For example, BASIC_CUN may be configured as a subchannel having a smallest number of symbols. For example, BASIC_CUN may be configured as a subchannel having a largest number of symbols.

For example, BASIC_CUN may be configured as (frequency) resources in (a pre-defined number of) SL slot units. Herein, for example, in case the corresponding rule is applied, SL transmission using one or more subchannels among SL slots having different numbers of symbols, or SL transmission using one or more subchannels having different numbers of symbols may not be differentiated in the aspect of CR measurement and/or CBR measurement.

Figure 19:
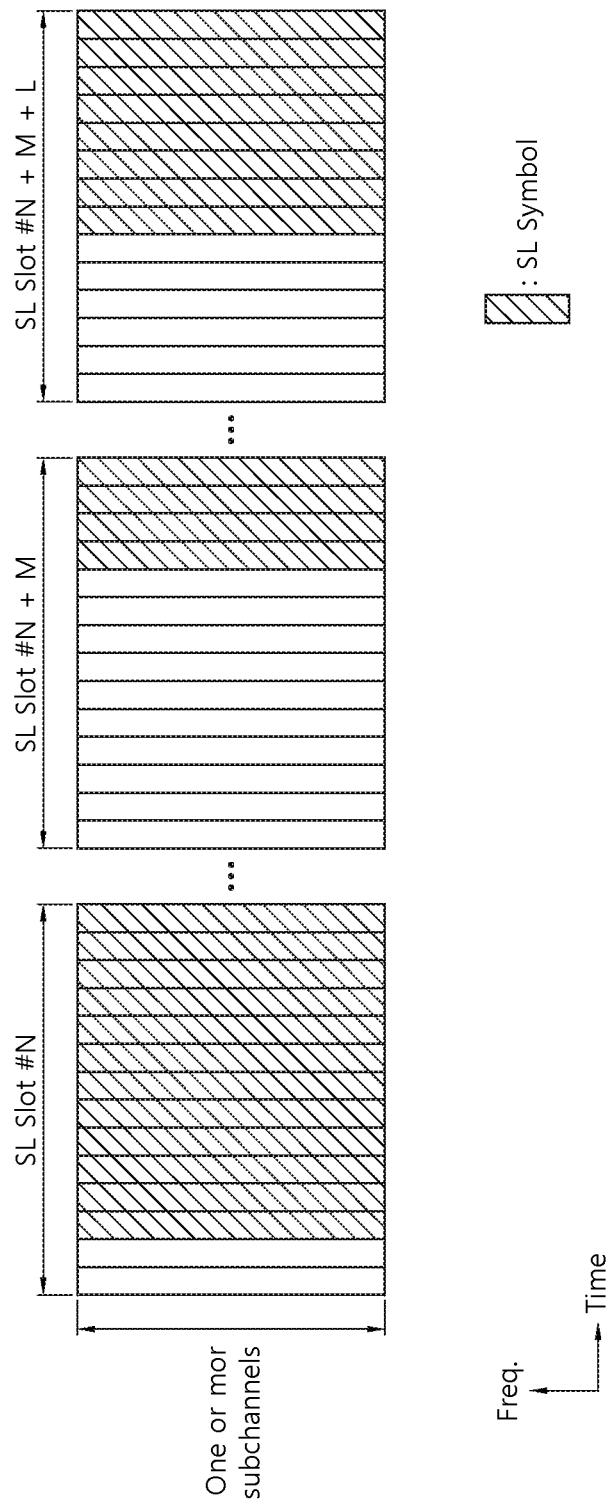
FIG. 19 shows an example of a basic resource unit being configured according to exemplary embodiment of the present disclosure.

FIG. 19 shows an example of a basic resource unit being configured according to exemplary embodiment of the present disclosure.

Referring to FIG. 19, it is assumed that a V2X resource pool includes SL slot #N, SL slot #N+M and SL slot #N+M+L. Additionally, it is also assumed that SL slot #N includes 12 SL symbols, and that SL slot #N+M includes 4 SL symbols, and that SL slot #N+M+L includes 8 sidelink symbols.

In this case, for example, in case BASIC_CUN is configured as a smallest amount (or number) of resource units that may be selected for SL transmission within a V2X resource pool, BASIC_CUN may be configured based on a slot having the smallest number of SL symbols. For example, in the embodiment of FIG. 19, based on SL slot #N+M, BASIC_CUN may be configured as one or more subcarriers including 4 symbols.

Alternatively, for example, in case BASIC_CUN is configured as a largest amount (or number) of resource units that may be selected for SL transmission within a V2X resource pool, BASIC_CUN may be configured based on a slot having the largest number of SL symbols. For example, in the embodiment of FIG. 19, based on SL slot #N, BASIC_CUN may be configured as one or more subcarriers including 12 symbols.

Referring back to FIG. 17, in step S2020, the UE may perform CR measurement and/or CBR measurement based on BASIC_CUN. And, in step S2030, the UE may perform sidelink transmission. For example, the sidelink transmission may be performed by using resource that are selected and/or occupied in accordance with the CR measurement and/or CBR measurement.

For example, in case of LTE V2X or LTE SL, the UE performed CR measurement and/or CBR measurement in subframe units. In case of LTE, since one entire subframe was used for the sidelink communication, no problem occurred even if the UE performed CR measurement and/or CBR measurement in subframe units.

However, in case of NR V2X or NR SL, due to a flexible slot format, instead of all symbols, only part of the symbols within a slot may be used for the sidelink communication. Even though only part of the symbols within a slot may be used for the sidelink communication, performing CR measurement and/or CBR measurement in all symbol units configuring the slot by the multiple UE may cause unfairness among the multiple UEs. For example, it will be assumed that a first UE may use 4 symbols in a first slot for sidelink communication and that a second UE may use 8 symbols in a second slot for sidelink communication. In this case, when the first UE and the second UE perform CR measurement and/or CBR measurement in units of 14 symbols, even though the second UE is capable of performing sidelink communication by using a larger number of resources as compared to the first UE, the CR measurement and/or CBR measurement may be performed according to a same reference standard. Alternatively, if a first UE performs CR measurement and/or CBR measurement in units of 4 symbols, and if a second UE performs CR measurement and/or CBR measurement in units of 8 symbols, even though the second UE is capable of performing sidelink communication by using a larger number of resources as compared to the first UE, the CR measurement and/or CBR measurement may be performed according to a same reference standard. This may act as a disadvantage in light of the first UE.

Conversely, according to an embodiment of the present disclosure, a UE may be configured of a BASIC_CUN for the CR measurement and/or CBR measurement, and the UE may perform the CR measurement and/or CBR measurement based on the BASIC_CUN. For example, it will be assumed that a first UE may use 4 symbols in a first slot for sidelink communication and that a second UE may use 8 symbols in a second slot for sidelink communication. Additionally, it will be assumed that the BASIC_CUN is a subchannel being configured of 4 symbols. In this case, for example, if the second UE occupies 8 symbols in the second slot, and if the first UE occupies 4 symbols in the first slot, when performing CR measurement, it will be viewed that the second UE occupies resources 2 times in the second slot, and it will be viewed that the first UE occupies resources 1 time in the first slot. Therefore, in case of performing the CR measurement and/or CBR measurement based on the BASIC_CUN, due to the flexible slot format, even though the number of SL symbols configuring the plurality of SL slots are different, the UE may fairly or efficiently perform the CR measurement and/or CBR measurement based on the BASIC_CUN.

Hereinafter, according to an embodiment of the present disclosure, a method of performing, by a UE, CR measurement and/or CBR measurement based on BASIC_CUN will be described in detail.

For example, when the UE performs CR measurement and/or CBR measurement, the UE may apply a value obtained by dividing RSCNM_SL by BASIC_CUN or a value obtained by normalizing RSCNM_SL with BASIC_CUN to the CR measurement and/or CBR measurement. Herein, RSCNM_SL may include at least one of a size (or number) of resource being used within a SL slot, a size (or number) of resource being used for SL transmission within a SL slot, a number of transmissions being performed within a given time, and/or a number of transmissions being performed for SL transmission within a given time. Herein, for example, in case of applying the corresponding rule, in the viewpoint of the CR and/or CBR, one or more subchannels being configured of a relatively larger number of symbols may be interpreted as having high weighted values. For example, in case of applying the corresponding rule, in the viewpoint of the CR and/or CBR, as compared to one or more subchannels being configured of a relatively smaller number of symbols, the weighted values may be interpreted as being relatively high.

Figure 20:
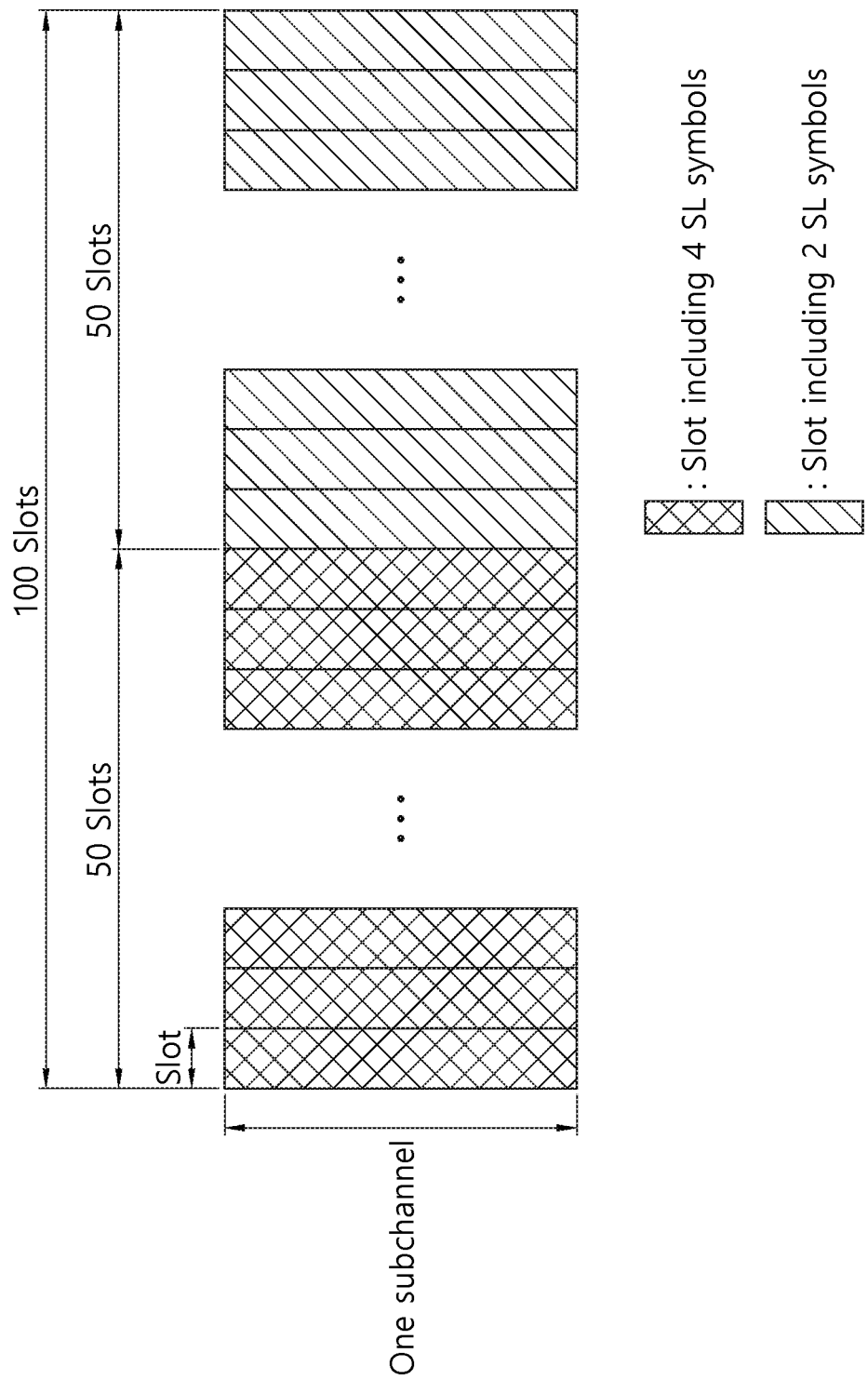
FIG. 20 shows a method for performing, by a UE, CR measurement and/or CRB measurement based on a resource unit according to an exemplary embodiment of the present disclosure.

FIG. 20 shows a method for performing, by a UE, CR measurement and/or CRB measurement based on a resource unit according to an exemplary embodiment of the present disclosure.

For simplicity in the description, in the embodiment of FIG. 20, it will be assumed that BASIC_CUN is configured of one or more symbols and one subchannel. However, this will not limit the technical scope or spirit of the present disclosure, and, as shown in the embodiment of FIG. 18, BASIC_CUN may also be configured of one or more symbols and multiple subchannels. Additionally, in the embodiment of FIG. 20, it will be assumed 50 SL slots each including 4 SL symbols exist and that 50 SL slots each including 2 SL symbols exist.

1) In Case of CR Measurement

It will be assumed that a first UE occupies 10 SL slots each including 4 SL symbols, and it will also be assumed that a second UE occupies 10 SL slots each including 2 SL symbols.

For example, when the UE calculates a CR value, a value of the denominator may be changed in accordance with the number of symbols configuring the BASIC_CUN. For example, in case the first UE calculates the CR value based on the BASIC_CUN, which is configured of 2 symbols and one subchannel, the CR value may be calculated as 13.33% (=20/150). For example, in case the second UE calculates the CR value based on the BASIC_CUN, which is configured of 2 symbols and one subchannel, the CR value may be calculated as 6.67% (=10/150). For example, in case the BASIC_CUN is configured as a subchannel being configured of 2 symbols, and if the UE uses a subchannel being configured of 4 symbols, as compared to a case where the UE uses a subchannel being configured of 2 symbols, the CR value may be increased to 2 times. In this case, accuracy in the CR measurement may be more enhanced.

For example, when the UE calculates a CR value, regardless of the number of symbols configuring the BASIC_CUN, the value of the denominator may be determined in accordance with a number of subchannels that may be used in an actual sidelink transmission. For example, in case the first UE calculates a CR value based on the BASIC_CUN, which is configured of 4 symbols and 1 subchannel, and a number of subchannels related with the sidelink, the CR value may be calculated as 10% (=10/100). For example, in case the second UE calculates a CR value based on the BASIC_CUN, which is configured of 4 symbols and 1 subchannel, and a number of subchannels related with the sidelink, the CR value may be calculated as 10% (=10/100). In this case, when performing CR measurement, a level of complexity in the UE embodiment may be decreased.

2) In Case of CBR Measurement 2.1) For example, it will be assumed that a RSSI value, which is measured from 50 SL slots each including 4 SL symbols, exceeds a threshold value.

For example, in case the UE calculates a CBR value based on the BASIC_CUN, which is configured of 2 symbols and 1 subchannel, the CBR value may be calculated as 75% (=100/150). For example, in case the UE calculates a CBR value based on the BASIC_CUN, which is configured of 4 symbols and 1 subchannel, the CBR value may be calculated as 50% (=50/100). In this case, when the UE calculates the CBR value, the value of the denominator may be changed in accordance with the number of symbols configuring the BASIC_CUN.

For example, in case the UE calculates a CBR value based on the BASIC_CUN, which is configured of 2 symbols and 1 subchannel, and a number of subchannels being related with the sidelink, the CBR value may be calculated as 100% (=100/100). Alternatively, for example, in case the UE calculates a CBR value based on the BASIC_CUN, which is configured of 4 symbols and 1 subchannel, and a number of subchannels being related with the sidelink, the CBR value may be calculated as 50% (=50/100). In this case, when the UE calculates a CBR value, regardless of the number of symbols configuring the BASIC_CUN, the value of the denominator may be determined in accordance with a number of subchannels that may be used in an actual sidelink transmission.

2.2) For example, it will be assumed that a RSSI value, which is measured from 25 SL slots each including 4 SL symbols, exceeds a threshold value, and that a RSSI value, which is measured from 25 SL slots each including 2 SL symbols, exceeds a threshold value.

For example, in case the UE calculates a CBR value based on the BASIC_CUN, which is configured of 2 symbols and 1 subchannel, the CBR value may be calculated as 50% (=75/150). Alternatively, for example, in case the UE calculates a CBR value based on the BASIC_CUN, which is configured of 4 symbols and 1 subchannel, the CBR value may be calculated as 50% (=50/100). In this case, when the UE calculates the CBR value, the value of the denominator may be changed in accordance with the number of symbols configuring the BASIC_CUN.

For example, in case the UE calculates a CBR value based on the BASIC_CUN, which is configured of 2 symbols and 1 subchannel, and a number of subchannels being related with the sidelink, the CBR value may be calculated as 75% (=75/100). Alternatively, for example, in case the UE calculates a CBR value based on the BASIC_CUN, which is configured of 4 symbols and 1 subchannel, the CBR value may be calculated as 50% (=50/100). In this case, when the UE calculates a CBR value, regardless of the number of symbols configuring the BASIC_CUN, the value of the denominator may be determined in accordance with a number of subchannels that may be used in an actual sidelink transmission.

For example, in the embodiment of FIG. 20, in case the BASIC_CUN is configured of a subchannel being configured of 2 symbols, when the UE uses a subchannel being configured of 4 symbols, as compared to a case where the UE uses a subchannel being configured of 2 symbols, the CBR value may be increased.

According to an embodiment of the present disclosure, in case a number of SL symbols configuring a slot is partly or fully different, the UE may fairly or efficiently perform the CR measurement and/or CBR measurement based on the BASIC_CUN.

According to an embodiment of the present disclosure, for resources related with transmissions of a pre-configured channel and/or signal, a UE may not perform CR measurement and/or CBR measurement. For example, the UE may exclude resources in which a pre-configured channel and/or signal is/are transmitted from the CR measurement and/or CBR measurement. Herein, for example, since the pre-configured channel and/or signal is/are not used for performing communication of a UE, which transmits the pre-configured channel and/or signal, but is/are used for performing communication (e.g., data re-transmission) of a UE, which receives the pre-configured channel and/or signal, the pre-configured channel and/or signal may be excluded from the CR measurement and/or CBR measurement. Alternatively, for example, the UE may also apply the transmission of the pre-configured channel and/or signal to the CR measurement and/or CBR measurement. However, in this case, a number of BASIC_CUNs or a value of BASIC_CUN to be applied when performing transmission of the pre-configured channel and/or signal may include at least one of the channels and/or signals listed below.

Channel for reporting HARQ-ACK (e.g., information indicating successful or non-successful decoding of the received data), and/or Channel for reporting channel status, and/or Channel for reporting measurement, and/or Channel for reporting measurement related to link quality, and/or Channel for transmitting or relaying a preemption message, and/or Channel related to S-SSB or S-SSB Channel related to transmission of a standalone PSCCH For example, the preemption message may be a message for preempting resources for enabling a UE, which intends to transmit a service or packet having a (relatively) high priority level, to transmit the service or packet having a high priority level. Alternatively, for example, the preemption message may be a message that is used by a UE, which intends to transmit a service or packet having a (relatively) high priority level, to notify another UE, which intends to transmit a service or packet having a (relatively) low priority level, to avoid using the resource for transmitting the service or packet having a high priority level. In this case, for example, in case a UE having received the preemption message has already reserved the corresponding resource, the UE having received the preemption message may trigger resource re-selection. Accordingly, the UE having received the preemption message may re-select another resource. For example, in order to avoid collision in an initial transmission, the standalone PSCCH may include control information for notifying other UEs of resource reservation information for an initial transmission and/or resource reservation information for re-transmission.

According to an exemplary embodiment of the present disclosure, a value of a time duration (or period) or a time length during which the CR measurement and/or CBR measurement is performed may be configured or signaled for the UE. For example, a network may configure or signal a value of a time duration (or period) or a time length during which the CR measurement and/or CBR measurement is performed to a UE. Herein, for example, a value of a time duration (or period) or a time length during which the CR measurement and/or CBR measurement is performed may be partly or fully configured differently among different service types, different priority levels, message generation types (e.g., periodic generation message and/or aperiodic generation message), PPPP, PPPR, and/or numerology (e.g., subcarrier spacing). For example, a value of a time duration (or period) or a time length during which the CR measurement and/or CBR measurement is performed may be configured identically among different service types, different priority levels, message generation types (e.g., periodic generation message and/or aperiodic generation message), PPPP, PPPR, and/or numerology (e.g., subcarrier spacing). For example, for aperiodic traffic, it may be unnecessary for the UE to perform CR measurement and/or CBR measurement during a long time period (or duration). Therefore, for example, a time period during which CR measurement and/or CBR measurement related with an aperiodic message is performed may be configured to be shorter than a time period during which CR measurement and/or CBR measurement related with a periodic message is performed.

For example, a value of the time period (or duration) or time length during which the CR measurement and/or CBR measurement is performed may be differently configured depending upon whether or not messages of different generation types (e.g., periodic generation message and/or aperiodic generation message) co-exist on a V2X resource pool. For example, a value of the time period (or duration) or time length during which the CR measurement and/or CBR measurement is performed may be differently configured depending upon whether or not messages of different generation types (e.g., periodic generation message and/or aperiodic generation message) co-exist on a V2X resource pool.

For example, CR measurement and/or CBR measurement may be independently performed per V2X resource pool and/or BWP. Alternatively, for example, the CR measurement and/or CBR measurement may be performed together on a plurality of pre-configured V2X resource pools or BWPs (e.g., V2X resource pool configured on a BWP of the same carrier).

Figure 21:
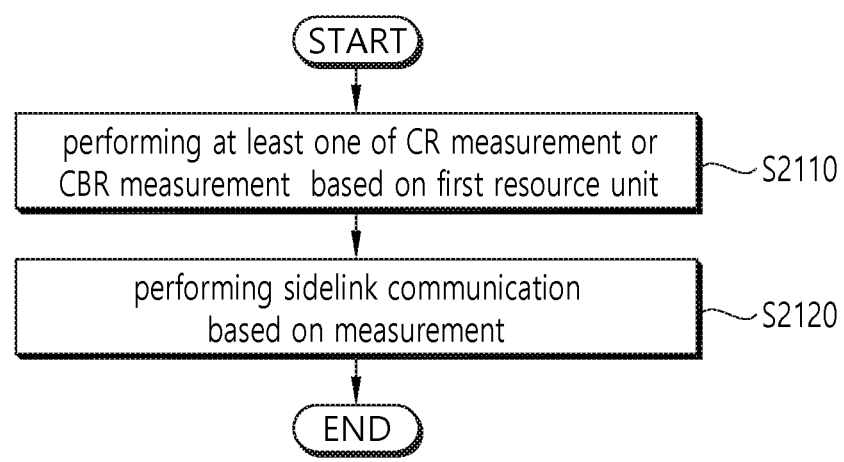
FIG. 21 shows a method for performing, by a first device (100), sidelink communication according to an exemplary embodiment of the present disclosure.

FIG. 21 shows a method for performing, by a first device (100), sidelink communication according to an exemplary embodiment of the present disclosure.

Referring to FIG. 21, in step S2110, based on a first resource unit, a first device (100) may perform at least one of Channel occupancy Ratio (CR) measurement or Channel Busy Ratio (CBR) measurement. For example, a number of symbols in the first resource unit may be a number of symbols related with a sidelink included a first slot among the multiple slots within the resource pool. For example, the first resource unit may include a number of symbols being related with a sidelink included the first slot and one or more subcarrier. The number of symbols being related with the sidelink may be different among the multiple slots.

For example, the first slot may include at least one of a symbol related with uplink, a symbol related with downlink or a flexible symbol, and the symbol related with sidelink may include at least one of the symbol related with uplink or the flexible symbol.

For example, among the multiple slots, the number of symbols related with sidelink included in the first slot may be the smallest value. For example, among the multiple slots, the number of symbols related with sidelink included in the first slot may be the largest value.

For example, the first resource unit may be configured based on at least one of sidelink service types, priority level related with the sidelink service, and reliability or numerology related with the sidelink service.

For example, the CR measurement or the CBR measurement may be performed for one or more subchannels related with the multiple slots.

Additionally, the first device (100) may occupy one or more subchannels related with the first slot and one or more subchannels related with the second slot. For example, if the number of symbols related with sidelink included in the second slot is larger than the number of symbols related with sidelink included in the first slot, the second slot may have a weighted value for the CR measurement that is greater than the first slot.

For example, if the S-RSSI measured from one or more subchannels related with the first slot and one or more subchannels related with the second slot exceeds a threshold value, and if the number of symbols related with the sidelink included in the first slot is greater than the number of symbols related with the sidelink included in the second slot, the second slot may have a weighted value for the CBR measurement that is greater than the first slot.

For example, the CR measurement or the CBR measurement may not be performed for a subchannel in which a specific channel is being transmitted. The specific channel may include at least one of a channel related with the transmission HARQ feedback or a channel related with a channel status report.

In step S2120, the first device (100) may perform the sidelink communication based on the measurement.

Additionally, the first device (100) may receive information for a time period (or duration) during which the CR measurement or the CBR measurement is performed.

The proposed method may be performed by various devices described in this specification. Firstly, a processor (102) of the first device (100) may perform at least one of Channel occupancy Ratio (CR) measurement or Channel Busy Ratio (CBR) measurement based on a first resource unit. Additionally, the processor (102) of the first device (100) may control a transceiver (106) so as to be capable of performing the sidelink communication based on the measurement.

Since examples of the above-described proposed methods may also be included as one of the implementation methods of the present disclosure, it will be apparent that the examples of the above-described proposed methods may be viewed as part of the proposed methods. Additionally, although the above-described proposed methods may be implemented independently, the above-described proposed methods may also be implemented as a form of combination (or integration) of some of the proposed methods. For example, although the proposed methods are described based on a 3GPP system for simplicity in the description of the present disclosure, the scope of the system in which the proposed methods can be applied may also be extendedly applied to other systems apart from the 3GPP system.

Hereinafter, an apparatus to which the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
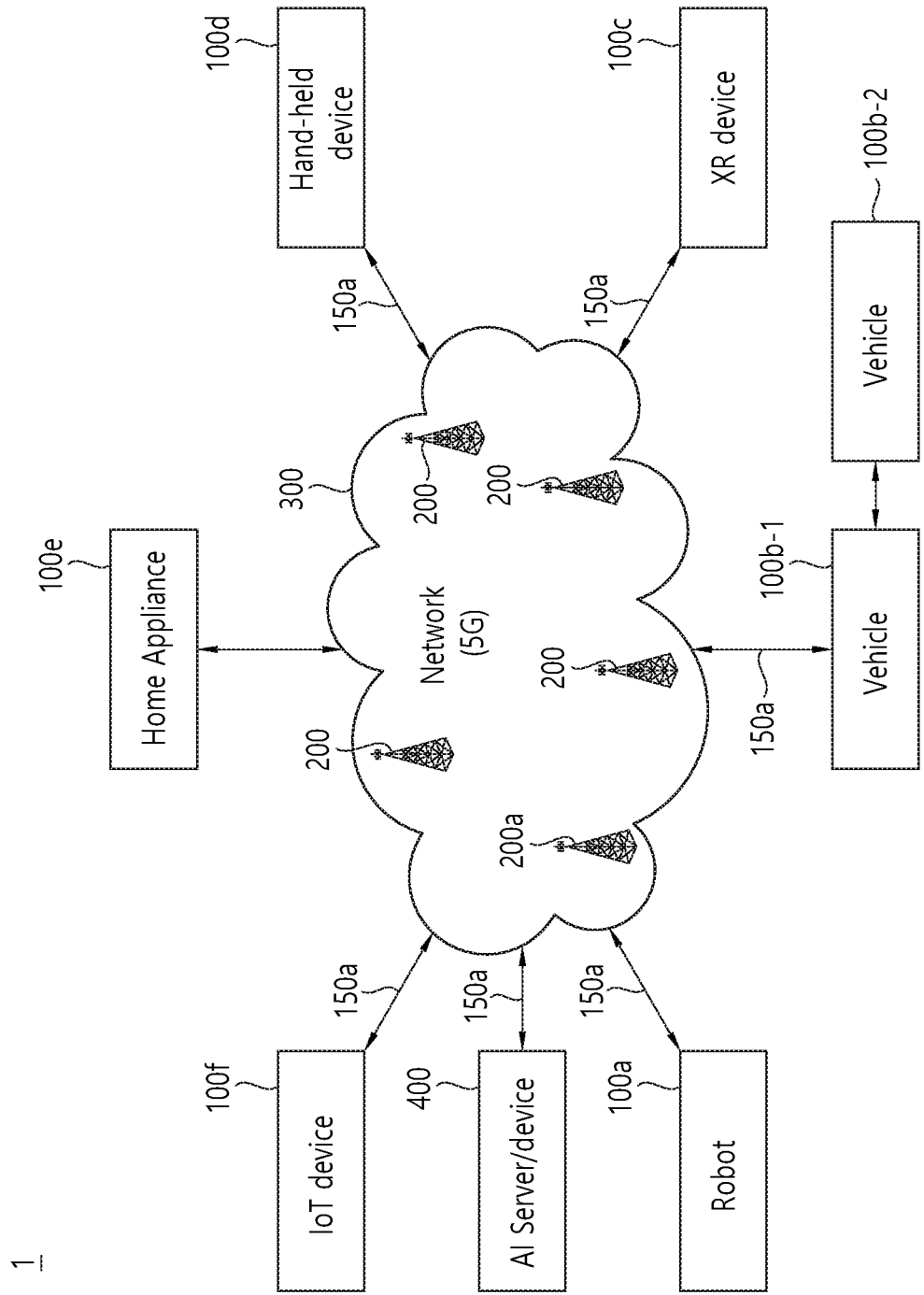
FIG. 22 shows a communication system (1) applied to the present disclosure.

FIG. 22 shows a communication system (1) applied to the present disclosure.

Referring to FIG. 22, a communication system (1) applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The handheld device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b) may be established between the wireless devices (100a~100f)/BS (200), or BS (200)/ wireless devices (100a~100f). Herein, the wireless communication/connections (150a, 150b) may be established through various RATs (e.g., 5G NR) such as uplink/downlink communication (150a), sidelink communication (150b) (or, D2D communication), or inter BS communication (e.g., relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 23:
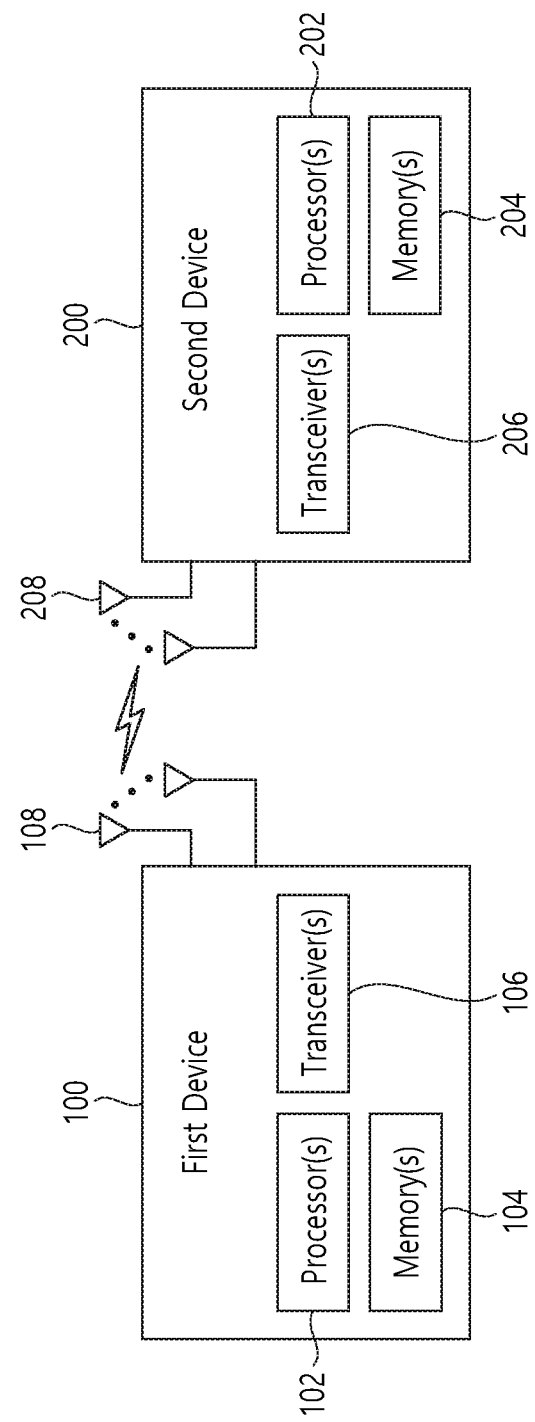
FIG. 23 shows wireless devices applicable to the present disclosure.

FIG. 23 shows wireless devices applicable to the present disclosure.

Referring to FIG. 23, a first wireless device (100) and a second wireless device (200) may transmit radio signals through a variety of RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 22.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Units (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and acquire the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels etc., from RF band signals into baseband signals in order to process received user data, control information, radio signals/channels, etc., using the one or more processors (102, 202). The one or more transceivers (106, 206) may convert the user data, control information, radio signals/channels, etc., processed using the one or more processors (102, 202) from the base band signals into the RF band signals. To this end, the one or more transceivers (106, 206) may include (analog) oscillators and/or filters.

Figure 24:
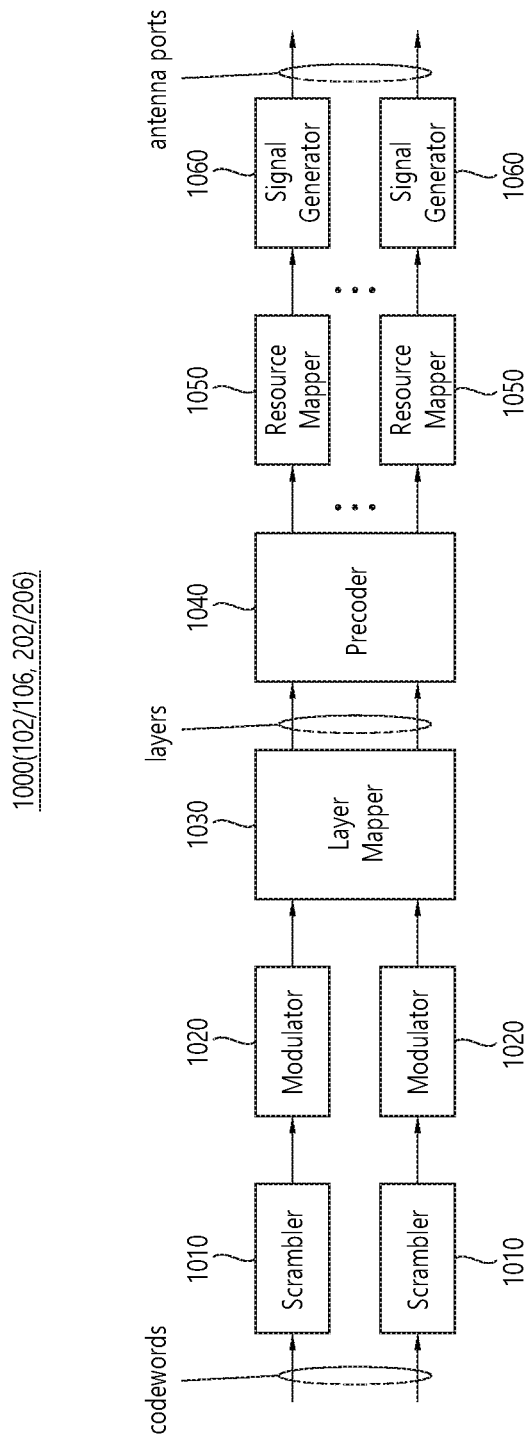
FIG. 24 shows a signal process circuit for a transmission signal.

FIG. 24 shows a signal process circuit for a transmission signal.

Referring to FIG. 24, a signal processing circuit (1000) may include scramblers (1010), modulators (1020), a layer mapper (1030), a precoder (1040), resource mappers (1050), and signal generators (1060). An operation/function of FIG. 24 may be performed, without being limited to, the processors (102, 202) and/or the transceivers (106, 206) of FIG. 23. Hardware elements of FIG. 24 may be implemented by the processors (102, 202) and/or the transceivers (106, 206) of FIG. 23. For example, blocks 1010~1060 may be implemented by the processors (102, 202) of FIG. 23. Alternatively, the blocks 1010 to 1050 may be implemented by the processors (102, 202) of FIG. 23 and the block 1060 may be implemented by the transceivers (106, 206) of FIG. 23.

Codewords may be converted into radio signals via the signal processing circuit (1000) of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 24. For example, the wireless devices (e.g., 100, 200 of FIG. 23) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 25:
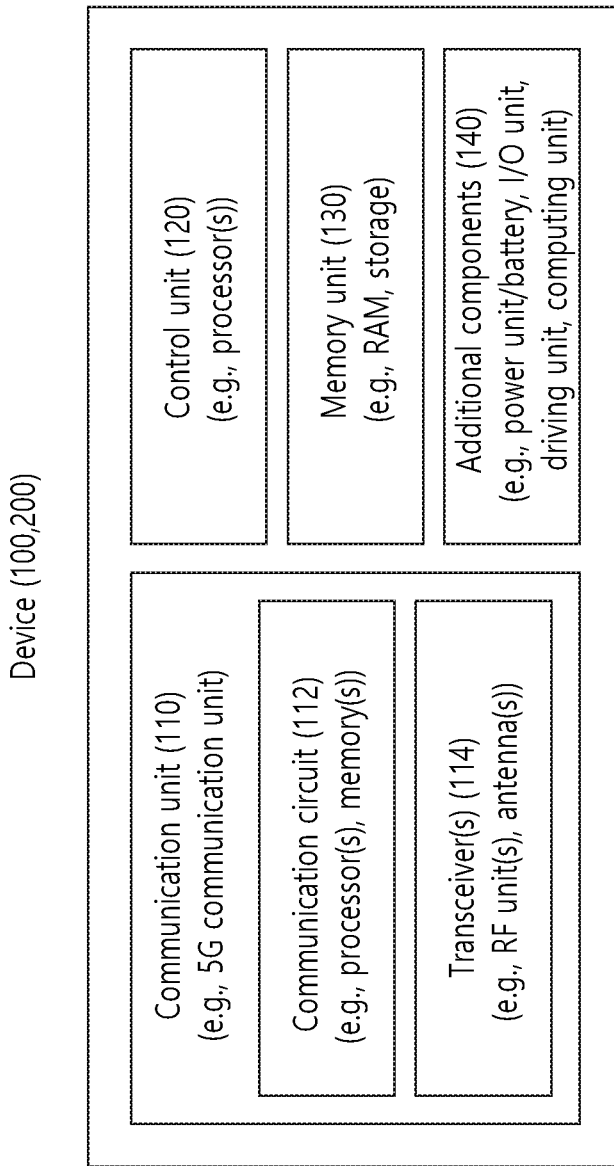
FIG. 25 shows another example of a wireless device applied to the present disclosure.

FIG. 25 shows another example of a wireless device applied to the present disclosure. The wireless device may be implemented in various forms according to a use-case/service (refer to FIG. 22 and FIGS. 26 to 31).

Referring to FIG. 25, wireless devices (100, 200) may correspond to the wireless devices (100, 200) of FIG. 23 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 23. For example, the transceiver(s) (114) may include the one or more transceivers (106, 206) and/or the one or more antennas (108, 208) of FIG. 23. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100*a* of FIG. 22), the vehicles (100*b*-1, 100*b*-2 of FIG. 22), the XR device (100*c* of FIG. 22), the hand-held device (100*d* of FIG. 22), the home appliance (100*e* of FIG. 22), the IoT device (100*f* of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 25, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof Hereinafter, an example of implementing FIG. 25 will be described in detail with reference to the drawings.

Figure 26:
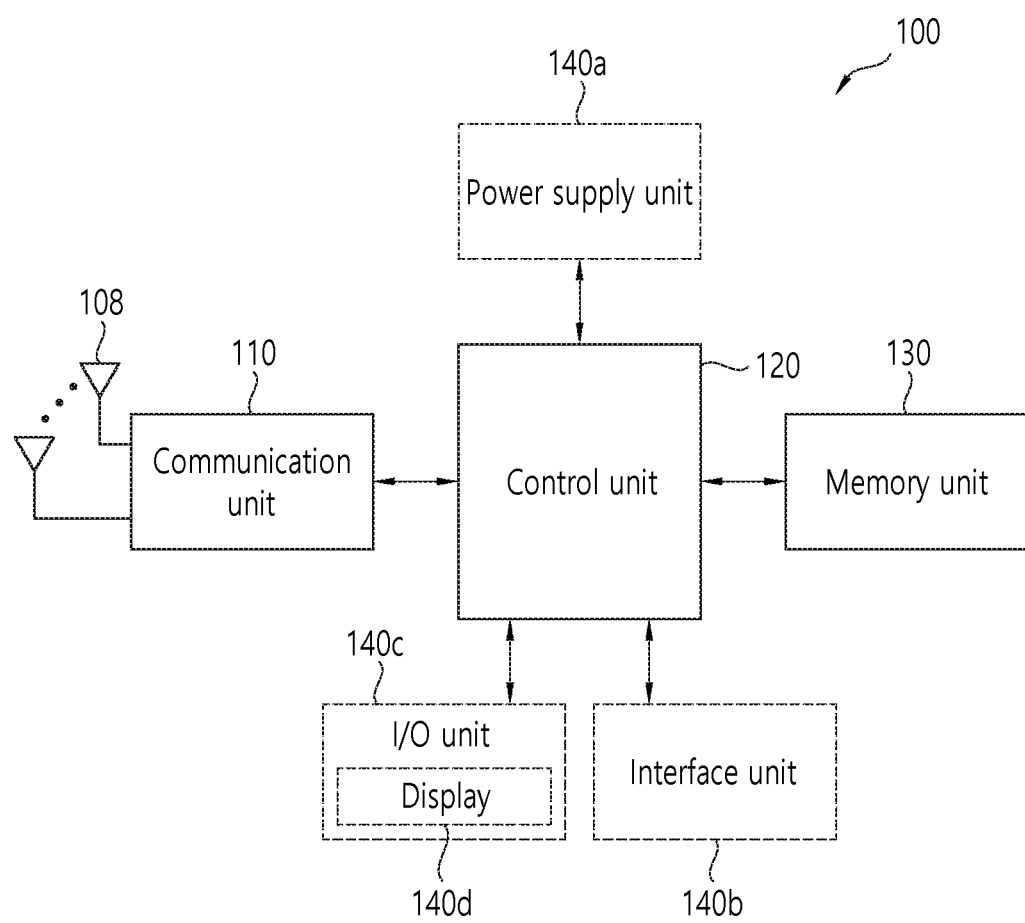
FIG. 26 shows a hand-held device applied to the present disclosure.

FIG. 26 shows a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device (100) may include an antenna unit (108), a communication unit (110), a control unit (120), a memory unit (130), a power supply unit (140*a*), an interface unit (140*b*), and an I/O unit (140*c*). The antenna unit (108) may be configured as a part of the communication unit (110). Blocks 110~130/140*a*~140*c* correspond to the blocks 110~130/140 of FIG. 25, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140*a*) may supply power to the hand-held device (100) and include a wired/wireless charging circuit, a battery, etc. The interface unit (140*b*) may support connection of the hand-held device (100) to other external devices. The interface unit (140*b*) may include various ports (e.g., an audio I/O port and a video I/O port) for connection with external devices. The I/O unit (140*c*) may input or output video information/signals, audio information/signals, data, and/or information input by a user. The I/O unit (140*c*) may include a camera, a microphone, a user input unit, a display unit (140*d*), a speaker, and/or a haptic module.

As an example, in the case of data communication, the I/O unit (140*c*) may acquire information/signals (e.g., touch, text, voice, images, or video) input by a user and the acquired information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140*c*).

Figure 27:
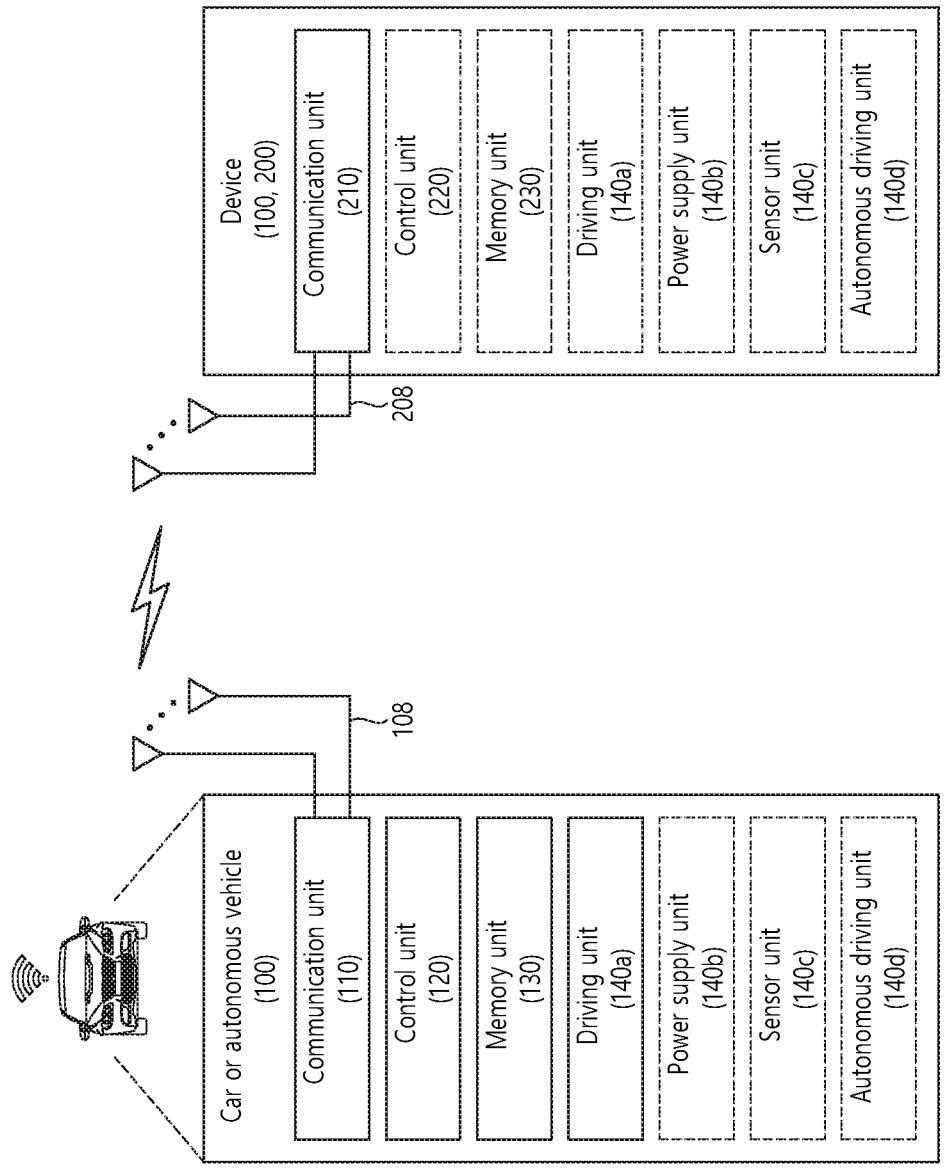
FIG. 27 shows a vehicle or an autonomous driving vehicle applied to the present disclosure.

FIG. 27 shows a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 27, a vehicle or autonomous driving vehicle (100) may include an antenna unit (108), a communication unit (110), a control unit (120), a driving unit (140*a*), a power supply unit (140*b*), a sensor unit (140*c*), and an autonomous driving unit (140*d*). The antenna unit (108) may be configured as a part of the communication unit (110). The blocks 110/130/140*a*~140*d* correspond to the blocks 110/130/140 of FIG. 25, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous driving vehicle (100). The control unit (120) may include an Electronic Control Unit (ECU). The driving unit (140*a*) may cause the vehicle or the autonomous driving vehicle (100) to drive on a road. The driving unit (140*a*) may include an engine, a motor, a powertrain, a wheel, a brake, a steering device, etc. The power supply unit (140*b*) may supply power to the vehicle or the autonomous driving vehicle (100) and include a wired/wireless charging circuit, a battery, etc. The sensor unit (140*c*) may acquire a vehicle state, ambient environment information, user information, etc. The sensor unit (140*c*) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit (140*d*) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, etc., from an external server. The autonomous driving unit (140*d*) may generate an autonomous driving path and a driving plan from the obtained data. The control unit (120) may control the driving unit (140*a*) such that the vehicle or the autonomous driving vehicle (100) may move along the autonomous driving path according to the driving plan (e.g., speed/direction control). In the middle of autonomous driving, the communication unit (110) may aperiodically/periodically acquire recent traffic information data from the external server and acquire surrounding traffic information data from neighboring vehicles. In the middle of autonomous driving, the sensor unit (140*c*) may obtain a vehicle state and/or surrounding environment information. The autonomous driving unit (140*d*) may update the autonomous driving path and the driving plan based on the newly obtained data/information. The communication unit (110) may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 28:
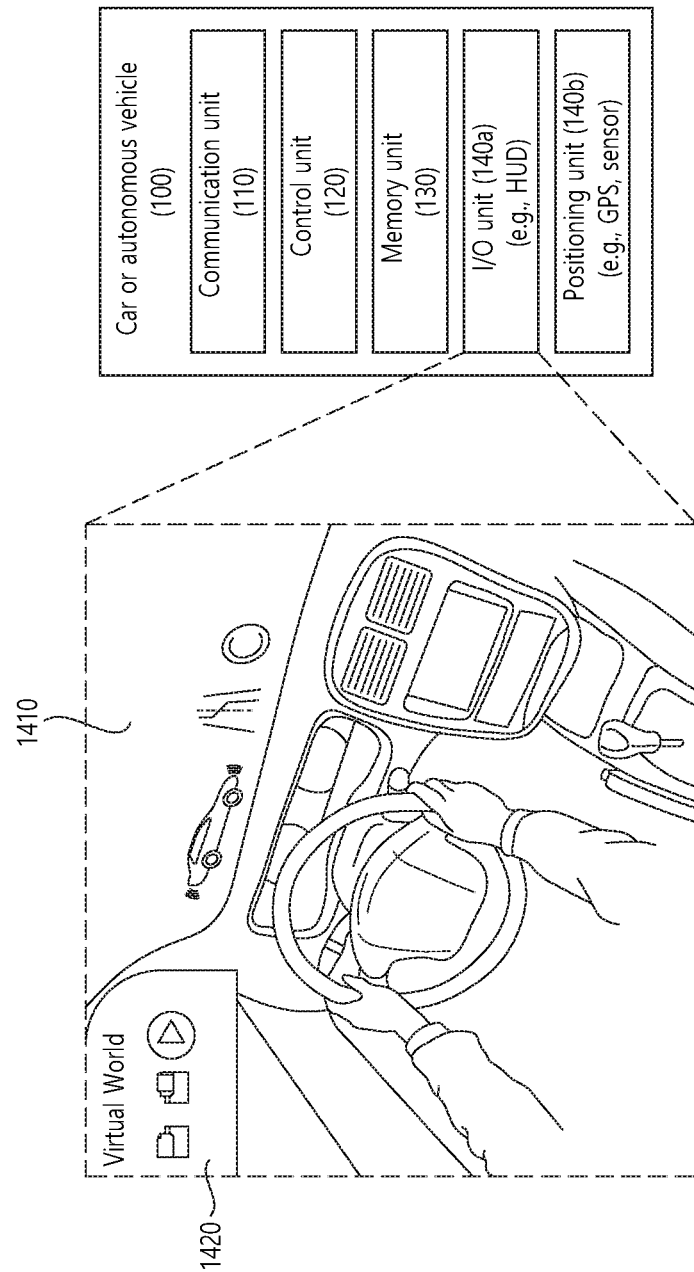
FIG. 28 shows a vehicle applied to the present disclosure.

FIG. 28 shows a vehicle applied to the present disclosure. The vehicle may be implemented as a transport means, an aerial vehicle, a ship, etc.

Referring to FIG. 28, a vehicle (100) may include a communication unit (110), a control unit (120), a memory unit (130), an I/O unit (140*a*), and a positioning unit (140*b*). Herein, the blocks 110 to 130/140*a*~140*b* correspond to blocks 110 to 130/140 of FIG. 25.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140*a*) may output an AR/VR object based on information within the memory unit (130). The I/O unit (140*a*) may include a HUD. The positioning unit (140*b*) may acquire information about the position of the vehicle (100). The position information may include information about an absolute position of the vehicle (100), information about the position of the vehicle (100) within a traveling lane, acceleration information, and information about the position of the vehicle (100) from a neighboring vehicle. The positioning unit (140*b*) may include a GPS and various sensors.

As an example, the communication unit (110) of the vehicle (100) may receive map information and traffic information from an external server and store the received information in the memory unit (130). The positioning unit (140*b*) may obtain the vehicle position information through the GPS and various sensors and store the obtained information in the memory unit (130). The control unit (120) may generate a virtual object based on the map information, traffic information, and vehicle position information and the I/O unit (140*a*) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140a). In addition, the control unit (120) may broadcast a warning message regarding driving abnormity to neighboring vehicles through the communication unit (110). According to situation, the control unit (120) may transmit the vehicle position information and the information about driving/vehicle abnormality to related organizations.

Figure 29:
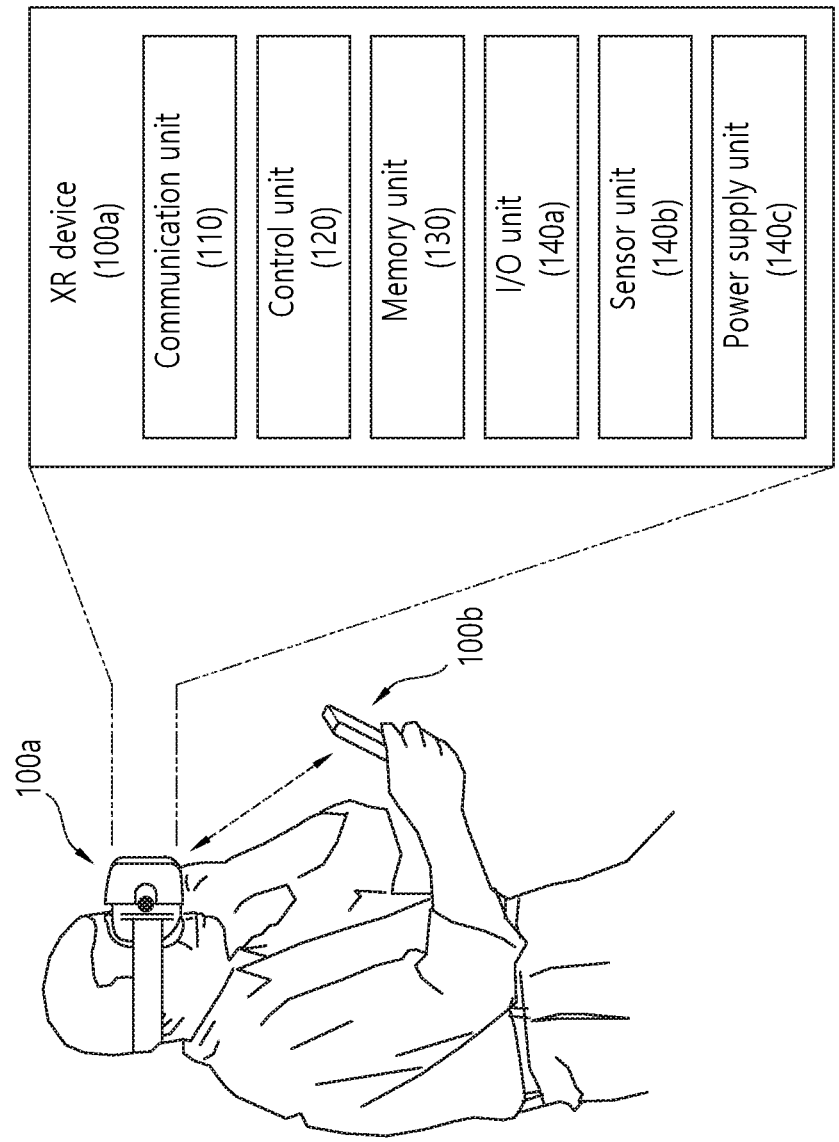
FIG. 29 shows an XR device applied to the present disclosure.

FIG. 29 shows an XR device applied to the present disclosure. The XR device may be implemented by an HIVID, a HUD mounted in a vehicle, a television, a smartphone, a computer, a wearable device, a home appliance, a digital signage, a vehicle, a robot, etc.

Referring to FIG. 29, an XR device (100a) may include a communication unit (110), a control unit (120), a memory unit (130), an I/O unit (140a), a sensor unit (140b), and a power supply unit (140c). Herein, the blocks 110 to 130/140a~140c correspond to the blocks 110 to 130/140 of FIG. 25, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100a). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, etc. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, etc.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device (100b)) or a media server through the communication unit (130). The communication unit (130) may download/stream content such as films or news from another device (e.g., the hand-held device (100b)) or the media server to the memory unit (130). The control unit (120) may control and/or perform procedures such as video/image acquisition, (video/image) encoding, and metadata generation/processing with respect to the content and generate/output the XR object based on information about a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information about a 3D position of the hand-held device (100b) and generate and output an XR object corresponding to the hand-held device (100b).

Figure 30:
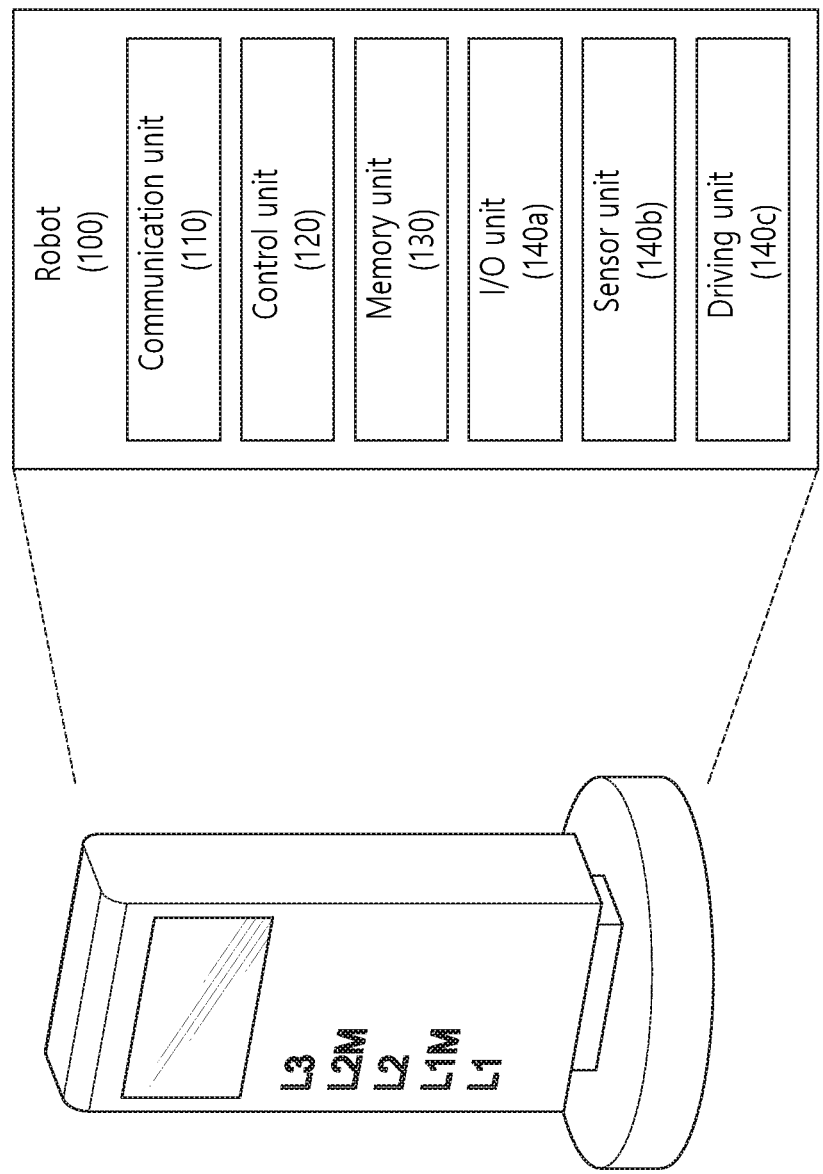
FIG. 30 shows a robot applied to the present disclosure.

FIG. 30 shows a robot applied to the present disclosure. The robot may be categorized into an industrial robot, a medical robot, a household robot, a military robot, etc., according to a used purpose or field.

Referring to FIG. 30, a robot (100) may include a communication unit (110), a control unit (120), a memory unit (130), an I/O unit (140a), a sensor unit (140b), and a driving unit (140c). Herein, the blocks 110 to 130/140a~140c correspond to the blocks 110 to 130/140 of FIG. 25, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, etc. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, etc.

Figure 31:
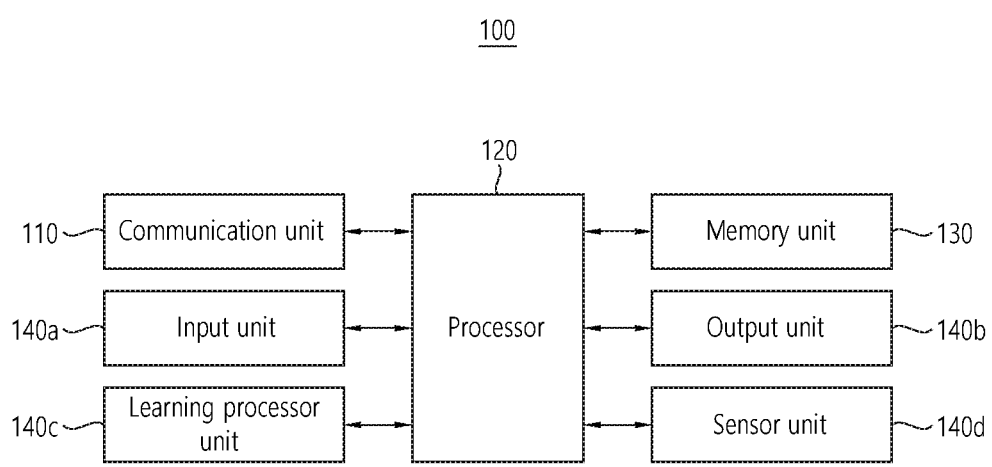
FIG. 31 shows an AI device applied to the present disclosure.

FIG. 31 shows an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 31, an AI device (100) may include a communication unit (110), a control unit (120), a memory unit (130), an I/O unit (140a/140b), a learning processor unit (140c), and a sensor unit (140d). The blocks 110 to 130/140a~140d correspond to blocks 110 to 130/140 of FIG. 25, respectively.

The communication unit (110) may transmit and receive wired/radio signals (e.g., sensor information, user input, learning models, or control signals) to and from external devices such as other AI devices (e.g., 100x, 200, 400 of FIG. 22) or an AI server (200) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 22). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may acquire various types of data from the exterior of the AI device (100). For example, the input unit (140a) may acquire learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 22). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

What is claimed is:

1. A method for performing sidelink communication by a first device, the method comprising:
    performing Channel Busy Ratio (CBR) measurement for a resource pool; and
    performing the sidelink communication based on the CBR measurement,
    wherein the resource pool includes at least one resource related to Hybrid Automatic Repeat Request (HARQ) feedback, at least one resource related to Physical Sidelink Control Channel (PSCCH), and at least one resource related to Physical Sidelink Shared Channel (PSSCH),
    wherein the CBR measurement for the resource pool is performed for the at least one resource related to the PSCCH and the at least one resource related to the PSSCH, and
    wherein the at least one resource related to the HARQ feedback included in the resource pool is excluded from the CBR measurement for the resource pool.

2. The method of claim 1, wherein performing the CBR measurement for the resource pool comprises:
    measuring sidelink received signal strength indicator (RSSI) for at least one subchannel included in the resource pool, and obtaining a ratio between a number of the at least one subchannel included in the resource pool and a number of subchannels in which the measured SL RSSI exceeds a threshold value.

3. The method of claim 1, wherein the CBR measurement for the resource pool is performed based on a first resource unit,
    wherein a number of symbols of the first resource unit, which is used for performing the CBR measurement, is a number of symbols related with sidelink included in a first slot, among a plurality of slots within the resource pool.

4. The method of claim 3, wherein the first slot includes at least one of a symbol related with uplink, a symbol related with downlink, or a flexible symbol, and
    wherein the symbol related with sidelink includes at least one of the symbol related with uplink or the flexible symbol.

5. The method of claim 3, wherein the first slot includes a smallest number of symbols related with sidelink among the plurality of slots.

6. The method of claim 3, wherein the first slot includes a largest number of symbols related with sidelink among the plurality of slots.

7. The method of claim 3, wherein the number of symbols related with sidelink is different among the plurality of slots.

8. The method of claim 3, wherein the first resource unit is configured based on at least one of a type of a sidelink service, a priority level related with the sidelink service, reliability related with the sidelink service or numerology.

9. The method of claim 3, wherein the first resource unit includes the number of symbols related with sidelink included in the first slot and one or more subcarriers.

10. The method of claim 3, wherein the CBR measurement is performed for one or more subchannels related with the plurality of slots.

11. The method of claim 3, further comprising:
    occupying one or more subchannels related with the first slot and one or more subchannels related with a second slot; and
    performing Channel occupancy Ratio (CR) measurement based on the first resource unit.

12. The method of claim 11, wherein, based on a number of symbols related with sidelink included in the second slot being greater than the number of symbols related with sidelink included in the first slot, a weighted value for the CR measurement of the second slot is higher than the first slot.

13. The method of claim 3, wherein, (i) based on S-RSSI measured from one or more subchannels related with the first slot and one or more subchannels related with a second slot exceeding a threshold value, and (ii) based on a number of symbols related with sidelink included in the second slot being greater than the number of symbols related with sidelink included in the first slot, a weighted value for the CBR measurement of the second slot is higher than the first slot.

14. The method of claim 1, further comprising:
receiving information regarding a time duration during which the CBR measurement is performed.

15. A first device configured to perform sidelink communication, the first device comprising:
one or more memories;
one or more transceivers; and
one or more processors operatively connecting the one or more memories and the one or more transceivers,
wherein the processor is configured to:
perform Channel Busy Ratio (CBR) measurement for a resource pool; and
perform the sidelink communication based on the CBR measurement,
wherein the resource pool includes at least one resource related to Hybrid Automatic Repeat Request (HARQ) feedback, at least one resource related to Physical Sidelink Control Channel (PSCCH), and at least one resource related to Physical Sidelink Shared Channel (PSSCH),
wherein the CBR measurement for the resource pool is performed for the at least one resource related to the PSCCH and the at least one resource related to the PSSCH, and
wherein the at least one resource related to the HARQ feedback included in the resource pool is excluded from the CBR measurement for the resource pool.

16. The first device of claim 15, wherein performing the CBR measurement for the resource pool comprises:
measuring sidelink received signal strength indicator (RSSI) for at least one subchannel included in the resource pool, and obtaining a ratio between a number of the at least one subchannel included in the resource pool and a number of subchannels in which the measured SL RSSI exceeds a threshold value.

17. The first device of claim 15, wherein the CBR measurement for the resource pool is performed based on a first resource unit,
wherein a number of symbols of the first resource unit, which is used for performing the CBR measurement, is a number of symbols related with sidelink included in a first slot, among a plurality of slots within the resource pool.

18. The first device of claim 17, wherein the first slot includes a smallest number of symbols related with sidelink among the plurality of slots.

19. The first device of claim 17, wherein the first slot includes a largest number of symbols related with sidelink among the plurality of slots.

20. The first device of claim 17, wherein the number of symbols related with sidelink is different among the plurality of slots.

* * * * *